(12) United States Patent
Zhao

(10) Patent No.: US 12,676,928 B2
(45) Date of Patent: Jul. 7, 2026

(54) NETWORK ICON DISPLAY METHOD AND DEVICE

(71) Applicant: Huawei Technologies Co., Ltd., Shenzhen (CN)

(72) Inventor: Wenlong Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 598 days.

(21) Appl. No.: 18/003,651

(22) PCT Filed: Mar. 1, 2021

(86) PCT No.: PCT/CN2021/078496
§ 371 (c)(1),
(2) Date: Dec. 28, 2022

(87) PCT Pub. No.: WO2022/001146
PCT Pub. Date: Jan. 6, 2022

(65) Prior Publication Data
US 2023/0239393 A1    Jul. 27, 2023

(30) Foreign Application Priority Data
Jun. 29, 2020    (CN) .......................... 202010605118.2

(51) Int. Cl.
*H04M 1/72454*        (2021.01)
*H04W 76/16*          (2018.01)
(Continued)

(52) U.S. Cl.
CPC ....... *H04M 1/72454* (2021.01); *H04W 76/16* (2018.02); *H04W 76/27* (2018.02); *H04W 76/30* (2018.02)

(58) Field of Classification Search
CPC .. H04M 1/72454; H04W 76/16; H04W 76/27
(Continued)

(56) References Cited

U.S. PATENT DOCUMENTS

2023/0024741 A1*  1/2023  Luo ........................ H04W 76/34
2023/0142719 A1*  5/2023  Zhu ........................ H04W 76/15
370/328

FOREIGN PATENT DOCUMENTS

CN    110831096 A  *  2/2020  ............ H04W 36/14
CN    111246543 A     6/2020

* cited by examiner

*Primary Examiner* — Jirapon Tulop
(74) *Attorney, Agent, or Firm* — WOMBLE BOND DICKINSON (US) LLP

(57)                ABSTRACT

This application provides a network icon display method and device, and relate to the field of electronic technologies. The method comprises: A terminal device is connected to a long term evolution LTE cell and a new radio NR cell by using a dual connectivity technology, and the LTE cell supports a non-standalone NSA networking mode. The terminal device displays a 5G network icon. After disconnecting from the NR cell, the terminal device enters a 4G connected mode. If the terminal device meets a preset condition, the terminal device sends first request information to a network side device, where the first request information is used to request to release the connection between the terminal device and the LTE cell. In response to releasing the connection between the terminal device and the LTE cell, the terminal device enters a 4G idle mode, and displays the 5G network icon.

20 Claims, 17 Drawing Sheets

Scenario: NSA is supported, and NR coverage is available 4G idle mode
4G connected mode + SCG
4G connected mode 5G  4G            5G          4G          5G
(1)         (2)       (3)           (4)

Changing point (1): The 4G idle mode -> the 4G connected mode; and a change from a 5G network icon to a 4G network icon Changing point (2): The 4G connected mode -> the 4G connected mode + SCG; and a change from the 4G network icon to the 5G network icon Changing point (3): The 4G connected mode + SCG -> the 4G connected mode; and the change from the 5G network icon to the 4G network icon Changing point (4): The 4G connected mode -> the 4G idle mode; and the change from the 4G network icon to the 5G network icon

(51) Int. Cl.
    *H04W 76/27*         (2018.01)
    *H04W 76/30*         (2018.01)

(58) Field of Classification Search
    USPC .......................................................... 455/418
    See application file for complete search history.

Scenario: NSA is supported,
and NR coverage is available

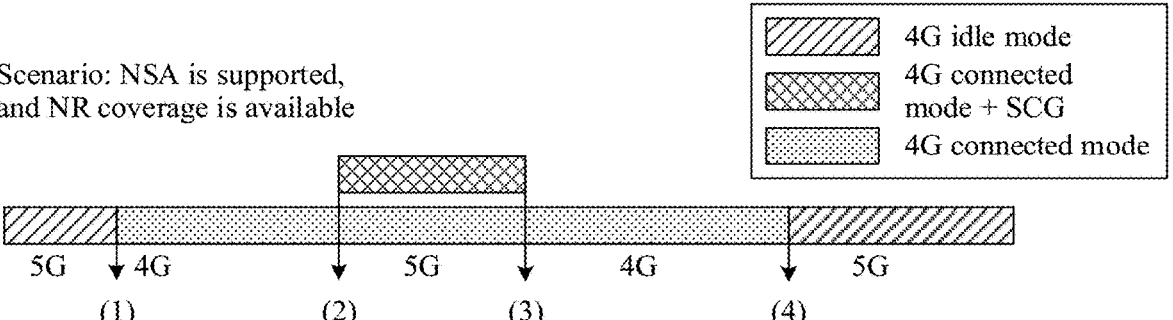

Changing point (1): The 4G idle mode -> the 4G connected mode; and a change from a 5G network icon to a 4G network icon Changing point (2): The 4G connected mode -> the 4G connected mode + SCG; and a change from the 4G network icon to the 5G network icon Changing point (3): The 4G connected mode + SCG -> the 4G connected mode; and the change from the 5G network icon to the 4G network icon Changing point (4): The 4G connected mode -> the 4G idle mode; and the change from the 4G network icon to the 5G network icon

FIG. 2

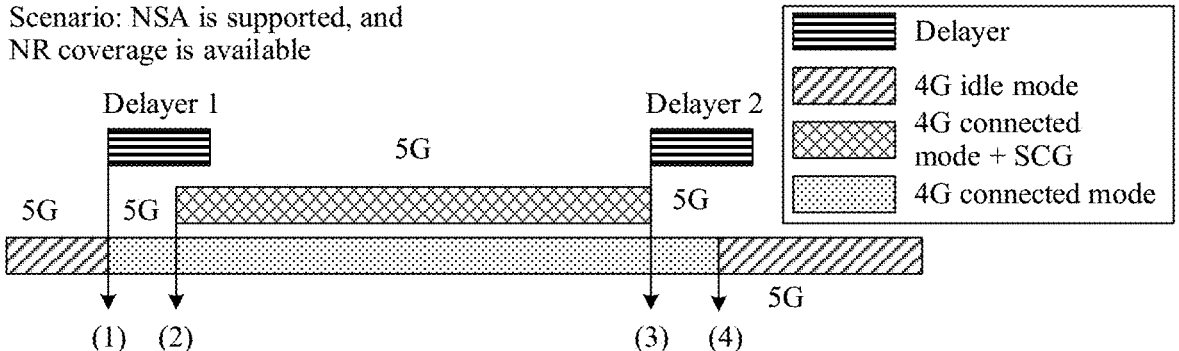

Scenario: NSA is supported, and
NR coverage is available

Changing point (1): The 4G idle mode -> the 4G connected mode;
and display a 5G network icon Changing point (2): The 4G connected mode -> the 4G connected
mode + SCG, and the delayer 1 is valid; and display the 5G network
icon Changing point (3): The 4G connected mode + SCG -> the 4G
connected mode, and the delayer 2 is valid; and display the 5G
network icon Changing point (4): The 4G connected mode -> the 4G idle mode;
and display the 5G network icon

FIG. 6A

Scenario: NSA is supported, and
NR coverage is available

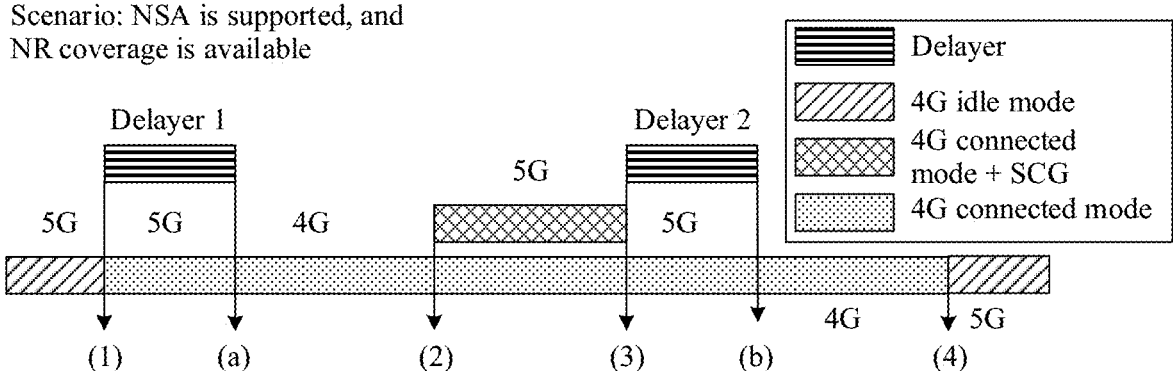

Changing point (1): The 4G idle mode -> the 4G connected mode,
and the delayer 1 is valid; and display a 5G network icon Occasion (a): The 4G connected mode -> the 4G connected mode,
and terminate the delayer 1; and a change from a 5G network icon
to a 4G network icon Changing point (2): The 4G connected mode -> the 4G connected
mode + SCG; and a change from the 4G network icon to the 5G
network icon Changing point (3): The 4G connected mode + SCG -> the 4G
connected mode; and display the 5G network icon Occasion (b): The 4G connected mode -> the 4G connected mode,
and terminate the delayer 2; and the change from the 5G network
icon to the 4G network icon Changing point (4): The 4G connected mode -> the 4G idle mode;
and the change from the 4G network icon to the 5G network icon

FIG. 6B

Scenario: NSA is supported, and
NR coverage is available

Occasion D: The 4G connected mode + SCG -> the 4G connected mode,
and the delayer 2 is valid; and continue to display a 5G network icon Occasion E: When the timer B expires, the 4G connected mode -> the 4G idle
mode; and continue to display the 5G network icon, and terminate the delayer 2

Scenario: NSA is supported, and
NR coverage is available

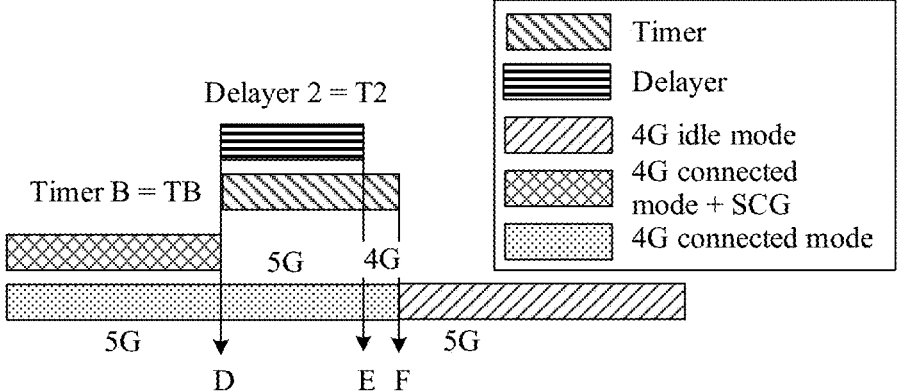

Occasion D: The 4G connected mode + SCG -> the 4G connected mode,
and the delayer 2 is valid; and continue to display a 5G network icon Occasion E: When the delayer 2 expires, the 4G connected mode
continues; and a change from the 5G network icon to a 4G network icon Occasion F: When the timer B expires, the 4G connected mode -> the 4G
idle mode; and a change from the 4G network icon to the 5G network icon

FIG. 8A

Scenario: NSA is supported, and
NR coverage is available

Occasion D: The 4G connected mode + SCG -> the 4G connected mode,
and the delayer 2 is valid; and continue to display a 5G network icon
Occasion E: When the timer B (delayer 2) expires, the 4G connected
mode -> the 4G idle mode; and continue to display the 5G network
icon Scenario: NSA is supported, and
NR coverage is available Occasion D: The 4G connected mode + SCG -> the 4G connected mode;
and a change from a 5G network icon to a 4G network icon Occasion E: When the timer B expires, the 4G connected mode -> the 4G
idle mode; and a change from the 4G network icon to the 5G network icon Scenario: NSA is supported, and
NR coverage is available

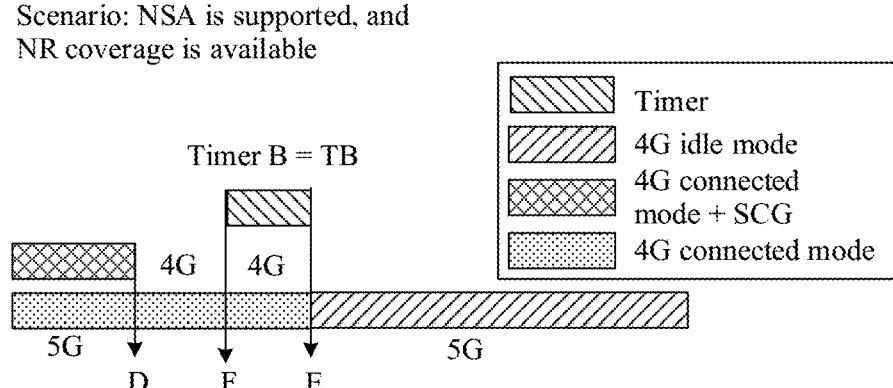

Occasion D: The 4G connected mode + SCG -> the 4G connected mode;
and a change from a 5G network icon to a 4G network icon Occasion F: When the timer B is started, the 4G connected mode;
still display the 4G network icon Occasion E: When the timer B expires, the 4G connected mode -> the 4G
idle mode; and a change from the 4G network icon to the 5G network icon

FIG. 11

Scenario: NSA is supported, and
NR coverage is available

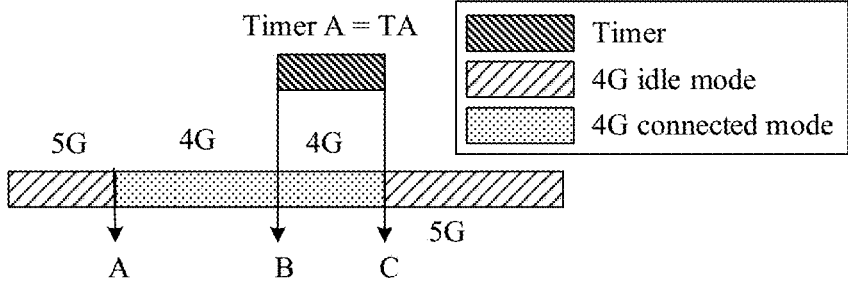

Occasion A: The 4G connected mode -> the 4G connected mode;
and a change from a 5G network icon to a 4G network icon Occasion B: When the timer A is started, the 4G connected mode;
and still display the 4G network icon Occasion C: When the timer A expires, the 4G connected mode -> the 4G
idle mode; and a change from the 4G network icon to the 5G network icon

FIG. 12

(a)
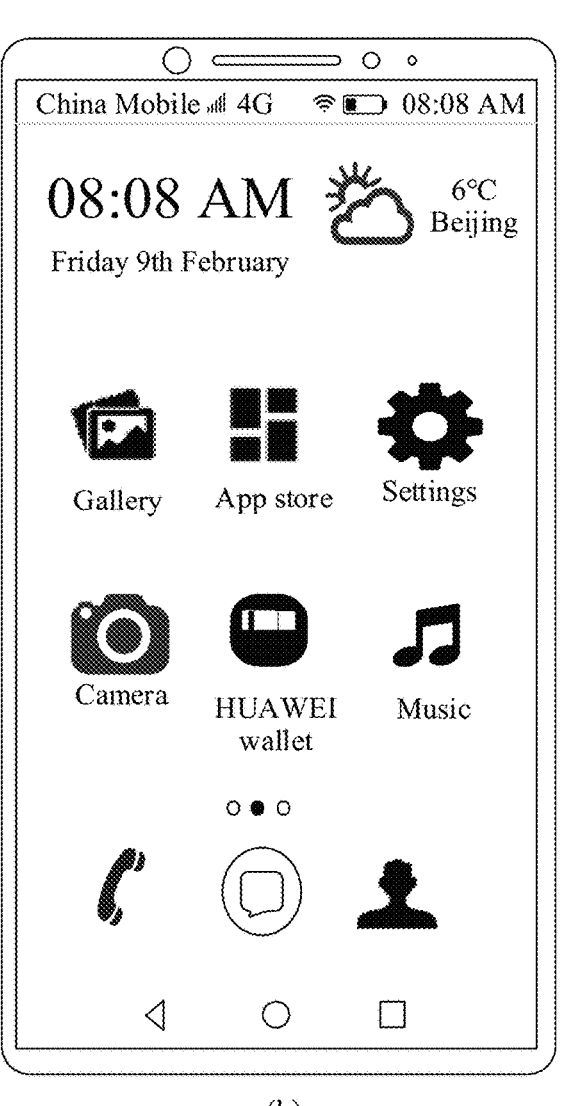
(b)
FIG. 13

NETWORK ICON DISPLAY METHOD AND DEVICE

CROSS-REFERENCE TO RELATED APPLICATIONS

This application is a national stage of International Application No. PCT/CN2021/078496, filed on Mar. 1, 2021, which claims priority to Chinese Patent Application No. 202010605118.2, filed on Jun. 29, 2020. Both of the aforementioned applications are hereby incorporated by reference in their entireties.

TECHNICAL FIELD

Embodiments of this application relate to the field of electronic technologies, and in particular, to a network icon display method and device.

BACKGROUND

With development of mobile communication technologies, a 5th generation (5G) mobile communication technology has become a mainstream trend of current mobile communication. In an initial phase of 5G networking, a non-standalone (NSA) networking mode is used. The NSA networking mode involves a 4th generation mobile communication technology (4G) network and a 5G network. Therefore, how to display a 5G network icon and a 4G network icon on a terminal device side such as a mobile phone is currently a hot issue in NSA networking research.

SUMMARY

Embodiments of this application provide a network icon display method and device, which can reduce power consumption of a terminal device, improve a display camping ratio of a 5G network icon, and improve user experience.

To achieve the foregoing objectives, the following technical solutions are applied to embodiments of this application.

According to one aspect, an embodiment of this application provides a network icon display method, applied to a terminal device. The terminal device is connected to a long term evolution LTE cell and a new radio NR cell by using a dual connectivity technology, and the LTE cell supports a non-standalone NSA networking mode. The method includes: The terminal device displays a 5G network icon. After disconnecting from the NR cell, the terminal device enters a 4G connected mode. If a preset condition is met, the terminal device sends first request information to a network side device, where the first request information is used to request to release the connection to the LTE cell. In response to releasing the connection to the LTE cell, the terminal device enters a 4G idle mode, and displays the 5G network icon.

In this solution, after the terminal device switches from a dual connectivity mode to the 4G connected mode, and when the preset condition is met, the terminal device actively requests the network side device to release an RRC connection to the LTE cell, so that the terminal device returns to the 4G idle mode and displays the corresponding 5G network icon. In this way, a display camping ratio of the 5G network icon can be improved, and user experience can be improved. In addition, the terminal device actively requests the network side device to release the RRC connection. This can further avoid a case in which an RRC is not released due to a network exception after the terminal device switches to the 4G connected mode or an RRC is not released even if there is no service for a long time, thereby reducing power consumption required by the terminal device to maintain an air interface connection, and saving power of the terminal device.

In an embodiment, the first request information is used to indicate that the terminal device has no user traffic. For example, the first request information is a tracking area update TAU request message.

In this solution, the terminal device may send the TAU message to the network side device, to indicate that the terminal device currently has no user traffic, so as to request to release the RRC connection to the LTE cell.

In an embodiment, the preset condition includes one or more of the following items: entering a screen-off state; entering a power saving mode or an ultra power saving mode; a temperature being greater than or equal to a first preset threshold; a power being less than or equal to a second preset threshold; an uplink rate being less than or equal to a third preset threshold; or running only an application in a whitelist.

In other words, in a plurality of cases specified in the foregoing conditions, the terminal device may actively request the network side device to release the RRC connection to the LTE cell.

In an embodiment, the preset condition includes: Duration in which there is no user traffic in the 4G connected mode is greater than or equal to first preset duration.

In other words, when the duration in which the terminal device has no user traffic in the 4G connected mode is greater than or equal to the first preset duration, the terminal device may actively request the network side device to release the RRC connection to the LTE cell.

In an embodiment, the method further includes: The terminal device displays a 4G network icon after entering the 4G connected mode and before entering the 4G idle mode.

In this solution, after entering the 4G connected mode, the terminal device displays the 4G network icon corresponding to the 4G connected mode, and does not switch to display the 5G network icon until entering the 4G idle mode.

In an embodiment, the method further includes: After entering the 4G connected mode, the terminal device starts a first delayer and displays a 5G network icon.

In this solution, after switching from the dual connectivity mode to the 4G connected mode, the terminal device may immediately start the first delayer, and display the 5G network icon within a timing period (or referred to as a valid period) after the first delayer is started.

In an embodiment, that the terminal device sends the first request information to the network side device if the preset condition is met includes: If the terminal device detects that there is no user traffic in the 4G connected mode, the terminal device starts a first timer, where the first timer corresponds to the first preset duration. If the duration in which the terminal device has no user traffic in the 4G connected mode is greater than or equal to the first preset duration, and the first timer stops timing before the first delayer, the terminal device sends the first request information to the network side device after the first timer stops timing. The method further includes: After entering the 4G idle mode, the terminal device stops timing of the first delayer.

In this solution, after switching from the dual connectivity mode to the 4G connected mode, the terminal device does not immediately start the first timer, but starts the first timer when detecting that there is no user traffic in the 4G connected mode. In addition, when the first timer stops timing before the first delayer, and after the first timer stops timing, the terminal device actively requests to release the RRC connection, enters the 4G idle mode, stops timing of the first delayer, and keeps displaying the 5G network icon.

In an embodiment, that the terminal device sends the first request information to the network side device if the preset condition is met includes: If the terminal device detects that there is no user traffic in the 4G connected mode, the terminal device starts a first timer, where the first timer corresponds to the first preset duration. If the first delayer stops timing before the first timer, the terminal device displays a 4G network icon after the first delayer stops timing. If the duration in which there is no user traffic in the 4G connected mode is greater than or equal to the first preset duration, the terminal device sends the first request information to the network side device after the first timer stops timing.

In this solution, after switching from the dual connectivity mode to the 4G connected mode, the terminal device does not immediately start the first timer, but starts the first timer when detecting that there is no user traffic in the 4G connected mode. In addition, when the first delayer stops timing before the first timer, the terminal device displays the 4G network icon after the first delayer stops timing. After the duration in which there is no user traffic in the 4G connected mode is greater than or equal to the first preset duration, the terminal device actively requests to release the RRC connection, enters the 4G idle mode, and switches to display the 5G network icon.

In an embodiment, the first delayer corresponds to preset delay duration T2. The method further includes: The terminal device starts a first timer after entering the 4G connected mode, where the first timer corresponds to the first preset duration TB, and TB is less than or equal to T2. That the terminal device sends the first request information to the network side device if the preset condition is met includes: If the duration in which there is no user traffic in the 4G connected mode is greater than or equal to TB, the terminal device sends the first request information to the network side device after the first timer stops timing. The method further includes: stopping timing of the first delayer after entering the 4G idle mode.

In this solution, after switching from the dual connectivity mode to the 4G connected mode, the terminal device immediately starts the first timer. In addition, when TB is less than or equal to T2, the first timer stops timing before the first delayer, or the first timer and the first delayer stop timing at the same time. After the first timer stops timing, the terminal device actively requests to release the RRC connection, enters the 4G idle mode, stops timing of the first delayer, and keeps displaying the 5G network icon.

In an embodiment, the first delayer corresponds to preset delay duration T2, and T2 is equal to the first preset duration. That the terminal device sends the first request information to the network side device if the preset condition is met includes: If the duration in which there is no user traffic in the 4G connected mode is greater than or equal to T2, the terminal device sends the first request information to the network side device after the first delayer stops timing.

In this solution, after switching from the dual connectivity mode to the 4G connected mode, the terminal device immediately starts the first timer. The first timer may be the first delayer. Then, after the duration in which there is no user traffic in the 4G connected mode is greater than or equal to T2, and when the first delayer stops timing, the terminal device actively requests to release the RRC connection, enters the 4G idle mode, and keeps displaying the 5G network icon.

In an embodiment, the first delayer corresponds to preset delay duration T2. The method further includes: The terminal device starts a first timer after entering the 4G connected mode, where the first timer corresponds to the first preset duration TB, and TB is greater than T2. The terminal device displays a 4G network icon after the first delayer stops timing. That the terminal device sends the first request information to the network side device if the preset condition is met includes: If the duration in which there is no user traffic in the 4G connected mode is greater than or equal to TB, the terminal device sends the first request information to the network side device after the first timer stops timing.

In this solution, after switching from the dual connectivity mode to the 4G connected mode, the terminal device immediately starts the first timer. In addition, when TB is greater than T2, the first delayer stops timing before the first timer. After the first delayer stops timing, the terminal device switches from displaying the 5G network icon to displaying the 4G network icon. After the first timer stops timing, the terminal device actively requests to release the RRC connection, enters the 4G idle mode, and switches to display the 5G network icon.

According to another aspect, an embodiment of this application provides a network icon display method, applied to a terminal device. After registering with a long term evolution LTE cell, the terminal device enters a 4G idle mode, and the LTE cell supports a non-standalone NSA networking mode. The method includes: The terminal device displays a 5G network icon. After establishing a connection to the LTE cell, the terminal device enters a 4G connected mode. If a preset condition is met, the terminal device sends first request information to a network side device, where the first request information is used to request to release the connection between the terminal device and the LTE cell. In response to releasing the connection to the LTE cell, the terminal device enters the 4G idle mode, and displays the 5G network icon.

In this solution, after the terminal device switches from the idle mode to the 4G connected mode, and when the preset condition is met, the terminal device actively requests the network side device to release an RRC connection to the LTE cell, so that the terminal device returns to the 4G idle mode and displays the corresponding 5G network icon. In this way, a display camping ratio of the 5G network icon can be improved, and user experience can be improved. In addition, the terminal device actively requests the network side device to release the RRC connection. This can further avoid a case in which an RRC is not released due to a network exception after the terminal device switches to the 4G connected mode or an RRC is not released even if there is no service for a long time, thereby reducing power consumption required by the terminal device to maintain an air interface connection, and saving power of the terminal device.

In an embodiment, the first request information is used to indicate that the terminal device has no user traffic. For example, the first request information is a tracking area update TAU request message.

In an embodiment, the preset condition includes one or more of the following items: entering a screen-off state; entering a power saving mode or an ultra power saving mode; a temperature being greater than or equal to a first preset threshold; a power being less than or equal to a second preset threshold; an uplink rate being less than or equal to a third preset threshold; or running only an application in a whitelist.

In other words, in a case specified in the foregoing conditions, the terminal device may actively request the network side device to release the RRC connection to the LTE cell.

In an embodiment, the preset condition includes: Duration in which there is no user traffic in the 4G connected mode is greater than or equal to second preset duration.

In other words, when the duration in which the terminal device has no user traffic in the 4G connected mode is greater than or equal to the second preset duration, the terminal device may actively request the network side device to release the RRC connection to the LTE cell.

In an embodiment, the method further includes: The terminal device displays a 4G network icon after entering the 4G connected mode and before entering the 4G idle mode.

In this solution, after entering the 4G connected mode, the terminal device displays the 4G network icon corresponding to the 4G connected mode, and does not switch to the 5G network icon until entering the 4G idle mode.

In an embodiment, the method further includes: After entering the 4G connected mode, the terminal device starts a second delayer and displays a 5G network icon.

In this solution, after switching from a dual connectivity mode to the 4G connected mode, the terminal device may immediately start the second delayer, and display the 5G network icon within a timing period after the second delayer is started.

In an embodiment, that the terminal device sends the first request information to the network side device if the preset condition is met includes: If the terminal device detects that there is no user traffic in the 4G connected mode, the terminal device starts a second timer, where the second timer corresponds to the second preset duration. If the duration in which there is no user traffic in the 4G connected mode is greater than or equal to the second preset duration, and the second timer stops timing before the second delayer, the terminal device sends the first request information to the network side device after the second timer stops timing. The method further includes: The terminal device stops timing of the second delayer after entering the 4G idle mode.

In this solution, after switching from the idle mode to the 4G connected mode, the terminal device does not immediately start the second timer, but starts the second timer when detecting that there is no user traffic in the 4G connected mode. In addition, when the second timer stops timing before the second delayer, and after the second timer stops timing, the terminal device actively requests to release the RRC connection, enters the 4G idle mode, stops timing of the second delayer, and keeps displaying the 5G network icon.

In an embodiment, that the terminal device sends the first request information to the network side device if the preset condition is met includes: If the terminal device detects that there is no user traffic in the 4G connected mode, the terminal device starts a second timer, where the second timer corresponds to the second preset duration. If the second delayer stops timing before the second timer, the terminal device displays a 4G network icon after the second delayer stops timing. If the duration in which there is no user traffic in the 4G connected mode is greater than or equal to the second preset duration, the terminal device sends the first request information to the network side device after the second timer stops timing.

In this solution, after switching from the idle mode to the 4G connected mode, the terminal device does not immediately start the second timer, but starts the second timer when detecting that there is no user traffic in the 4G connected mode. In addition, when the second delayer stops timing before the second timer, the terminal device displays the 4G network icon after the second delayer stops timing. After the duration in which there is no user traffic in the 4G connected mode is greater than or equal to the second preset duration, the terminal device actively requests to release the RRC connection, enters the 4G idle mode, and switches to display the 5G network icon.

According to another aspect, an embodiment of this application provides another network icon display method, applied to a terminal device. The method includes: The terminal device enters a connected mode after registering with a first cell. If a preset condition is met, the terminal device sends first request information to a network side device, where the first request information is used to request to release a connection to the first cell. In response to releasing the connection to the first cell, the terminal device enters an idle mode.

In this solution, after entering the connected mode, when the preset condition is met, the terminal device actively requests the network side device to release an air interface connection to the first cell in which the terminal device is located, so that the terminal device returns to the idle mode. This can avoid a case in which, after the terminal device switches to the connected mode, an RRC is not released due to a network exception or an RRC is not released even if there is no service for a long time, thereby reducing power consumption required by the terminal device to maintain the air interface connection, and saving power of the terminal device.

In an embodiment, the preset condition includes: Duration in which there is no user traffic in the connected mode is greater than or equal to third preset duration. Alternatively, the preset condition includes one or more of the following items: entering a screen-off state; entering a power saving mode or an ultra power saving mode; a temperature being greater than or equal to a first preset threshold; a power being less than or equal to a second preset threshold; an uplink rate being less than or equal to a third preset threshold; or running only an application in a whitelist.

In other words, in a plurality of cases specified in the foregoing conditions, the terminal device may actively request the network side device to release an RRC connection to the first cell.

According to another aspect, an embodiment of this application provides an icon display apparatus. The apparatus is included in a terminal device, and may be, for example, a chip or a module. The apparatus has a function of implementing behavior of the terminal device in any method in any one of the foregoing aspects and any one of the foregoing possible designs. The function may be implemented by hardware, or may be implemented by hardware executing corresponding software. The hardware or the software includes one or more modules or units corresponding to the foregoing function, for example, a display module or unit, a processing module or unit, and a transceiver module or unit.

According to another aspect, an embodiment of this application provides a terminal device. The terminal device includes: a screen, configured to display a network icon; one or more processors; a memory; and one or more computer programs, where the one or more computer programs are stored in the memory, the one or more computer programs include instructions, and when the instructions are executed by the terminal device, the terminal device is enabled to perform the network icon display method according to any one of the possible designs of the foregoing aspects.

According to another aspect, an embodiment of this application provides a terminal device, including one or more processors and one or more memories. The one or more memories are coupled to the one or more processors. The one or more memories are configured to store computer program code. The computer program code includes computer instructions. When the one or more processors execute the computer instructions, the terminal device is enabled to perform the network icon display method according to any one of the possible designs of the foregoing aspects.

According to another aspect, an embodiment of this application provides a computer storage medium, including computer instructions. When the computer instructions are executed on a terminal device, the terminal device is enabled to perform the network icon display method according to any one of the possible designs of the foregoing aspects.

According to another aspect, an embodiment of this application provides a computer program product. When the computer program product is run on a computer, a terminal device is enabled to perform the network icon display method according to any one of the possible designs of the foregoing aspects.

BRIEF DESCRIPTION OF DRAWINGS

FIG. 2 is a schematic diagram of a status and icon switching effect in a D+A display solution according to the conventional technology;

FIG. 6A is a schematic diagram of a status and icon switching effect according to an embodiment of this application;

FIG. 6B is a schematic diagram of another status and icon switching effect according to an embodiment of this application;

FIG. 8A is a schematic diagram of another status and icon switching effect according to an embodiment of this application;

FIG. 11 is a schematic diagram of another status and icon switching effect according to an embodiment of this application;

FIG. 12 is a schematic diagram of another status and icon switching effect according to an embodiment of this application; and FIG. 13 is a schematic diagram for displaying a network icon interface according to an embodiment of this application.

DESCRIPTION OF EMBODIMENTS

The following describes the technical solutions in embodiments of this application with reference to the accompanying drawings in embodiments of this application. In the descriptions of embodiments of this application, "/" represents "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

Figure 1:
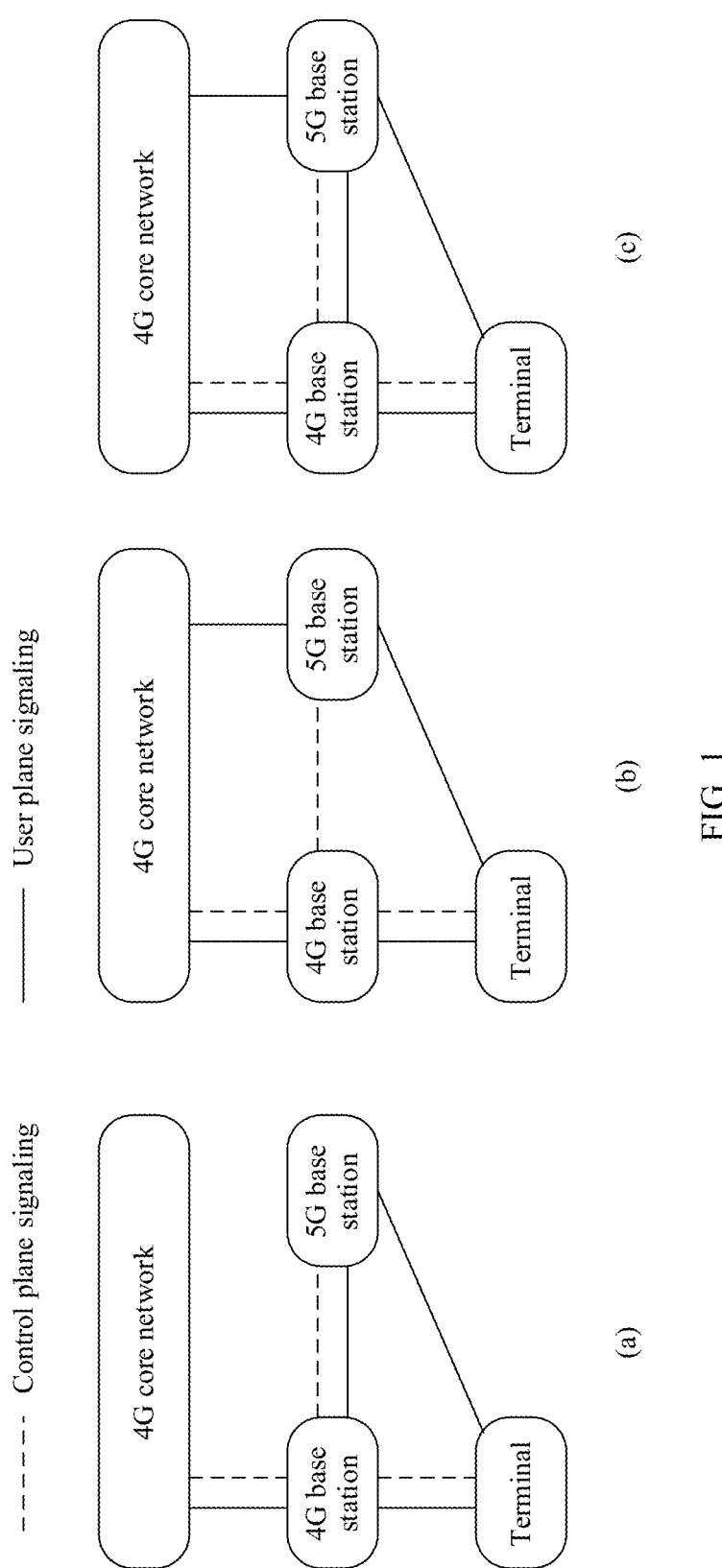
FIG. 1 is a schematic diagram of a network architecture in a group of EN-DC networking modes according to an embodiment of this application.

In an NSA networking mode, existing 4G network facilities can be used to deploy a 5G network. There may be a plurality of NSA networking modes. For example, in an NSA EN-DC networking mode, as shown in FIG. 1, a core network, a master base station, and a secondary base station of a mobile communication network are respectively a 4G core network, a 4G base station, and a 5G base station. The core network exchanges control plane signaling with the 4G base station, and the core network exchanges user plane signaling with the 4G base station and/or the 5G base station. For example, a 4G network may be a long term evolution (LTE) network. The 4G core network may be an evolved packet core (EPC). The 4G base station may also be referred to as an LTE base station, for example, may be an evolved NodeB (eNB or eNodeB). The 5G base station may also be referred to as a new radio (NR) base station, for example, may be a next generation NodeB (gNB).

NSA networking involves 4G and 5G network standards. Therefore, a terminal device in the NSA networking mode involves switching display of a 4G network icon and a 5G network icon. Currently, for operators, there are many types of 5G network icon display solutions and the solutions change frequently, and there is no unified display solution. Refer to Table 1. The Global System for Mobile Communications Association (GSMA) submits to the 3rd Generation Partnership Project (3GPP) four solutions for displaying a 5G network icon by a terminal device: CONFIG A, CONFIG B, CONFIG C, and CONFIG D.

TABLE 1

| Status | CONFIG A | CONFIG B | CONFIG C | CONFIG D |
|---|---|---|---|---|
| The terminal device is in an idle mode or a connected mode in an LTE cell, and the LTE cell does not support the NSA networking mode | 4G | 4G | 4G | 4G |
| The terminal device is in the idle mode or the connected mode in the LTE cell, the LTE cell supports the NSA networking mode, and signal coverage of the NR base station is not detected | 4G | 4G | 4G | 5G |
| The terminal device is in the connected mode in the LTE cell, the LTE cell supports the NSA networking mode, and the signal coverage of the NR base station is detected | 4G | 4G | 5G | 5G |
| The terminal device is in the idle mode in the LTE cell, the LTE cell supports the NSA networking mode, and the signal coverage of the NR base station is detected | 4G | 5G | 5G | 5G |
| The terminal device establishes LTE + NR dual connection in the LTE cell, and the LTE cell supports the NSA networking mode | 5G | 5G | 5G | 5G |
| The terminal device is in the idle mode or is connected to a 5G access network, and accesses a 5G core network | 5G | 5G | 5G | 5G |

In CONFIG A shown in Table 1, the terminal device camps on the LTE cell, and the LTE base station delivers 5G cell measurement control based on a capability of the terminal device. After obtaining a 5G cell through measurement, the terminal device reports the 5G cell to the LTE base station. The LTE base station initiates a secondary cell group (SCG) addition (or referred to as configuration) procedure. The terminal device enters a 4G+5G dual connectivity mode, and displays a 5G network icon. Alternatively, after accessing the 5G core network through the 5G access network, the terminal device displays the 5G network icon.

In CONFIG B shown in Table 1, after the terminal device camps on the LTE cell and enters the idle (IDLE) mode, if a 5G cell is found, the 5G network icon is displayed.

In CONFIG C shown in Table 1, if the terminal device in a 4G connected mode finds a 5G cell, a 5G network icon is displayed.

In CONFIG D shown in Table 1, a 5G terminal device supporting NSA is powered on and searches for a network, and camps on the LTE cell. If a system message SIB2 of the LTE cell includes a related field supporting NSA, the terminal device displays the 5G network icon.

In addition, when displaying the 4G or 5G network icon, the terminal device may further display a quantity of signal bars in a status bar based on strength of a 4G signal or a 5G signal.

The network icon display solution shown in Table 1 evolves into a D+A icon display solution. In this solution, when the terminal device camps on the LTE cell and is in a 4G idle mode, if the LTE cell supports the NSA networking mode, it may indicate that the LTE cell is a 5G anchor cell, the terminal device has a capability of accessing the Internet by using 4G and 5G, and the LTE cell and the terminal device have a dual connectivity capability. Therefore, the terminal device displays the 5G network icon. If the LTE cell does not support the NSA networking mode, the terminal device displays the 4G network icon. When the terminal device is in the 4G connected mode (namely, a state after an RRC connection is established, also referred to as an RRC connected mode or an LTE connected mode), if a network side (namely, an access network device side or a core network device side) adds an SCG to the terminal device, so that the terminal device establishes an LTE+NR dual connection (namely, a 4G+5G dual connection, a dual connection, or referred to as a 4G connected mode+SCG), it may indicate that the terminal device is using the 5G network to process a service. Therefore, the terminal device may display the 5G network icon. When the terminal device is in the 4G connected mode, if the network side does not add an SCG to the terminal device, and the terminal device does not establish an LTE+NR dual connection, the terminal actually uses the 4G network to process a service. Therefore, the terminal device may display the 4G network icon.

The LTE+NR dual connection means that the terminal device in the connected mode performs communication by using radio resources provided by a master node (MN) and a secondary node (SN). In addition, the master node and the secondary node respectively use a 4G LTE radio access technology and a 5G NR radio access technology. In an LTE+NR dual connected mode, the terminal device corresponds to a master cell group (MCG) and a secondary cell group SCG. The master cell group includes an LTE cell accessed by the terminal device, and the secondary cell group includes an NR cell. After establishing the LTE+NR dual connection, the terminal device accesses the LTE network and the NR network, and accesses the LTE base station and the NR base station.

In the D+A icon display solution, if the LTE cell on which the terminal device currently camps supports the NSA networking mode, the terminal device displays a 5G network icon when the terminal device is in the 4G idle mode. For example, the 4G base station may indicate, by using a preset field ULI in a SIB2 sent in an attachment process, whether the LTE cell on which the terminal device camps supports the NSA networking mode. If the SIB2 message includes the ULI field and a value of ULI is 1, it may indicate that the LTE cell supports NSA networking mode. If the LTE cell on which the terminal device currently camps is covered by an NR signal, and a condition for configuring the NR cell is met, the network side may add the SCG to the terminal device, and the terminal device may establish the LTE+NR dual connection. In this scenario, a network icon displayed on the terminal device may be switched between 4G and 5G for a plurality of times.

When the D+A icon display solution is used, a plurality of status changing points of the terminal device and a plurality of times of network icon switching are involved. For example, refer to FIG. 2. The terminal device switches from the 4G idle mode to the 4G connected mode at a changing point (1). After the network side adds the secondary cell group SCG to the terminal device, the terminal device switches from the 4G connected mode to the 4G connected mode+SCG at a changing point (2). In descriptions of the following embodiments, the 4G connected mode+SCG is also referred to as a dual connectivity mode. After the SCG is released (or referred to as deleted), the terminal device switches from the 4G connected mode+SCG to the 4G connected mode at a changing point (3), and switches from displaying the 5G network icon to displaying the 4G network icon. The terminal device switches from the 4G connected mode to the 4G idle mode at a changing point (4), and switches from displaying the 4G network icon to displaying the 5G network icon.

At the changing point (3) and the changing point (4), the terminal device frequently switches from the 5G network icon to the 4G network icon, a display time of the 5G network icon is short, and a display camping ratio is low. A user may be misled that a 5G network signal is unstable or a 5G capability of the terminal device is poor, resulting in poor user experience.

This embodiment of this application provides a network icon display method, so that when a terminal device uses a D+A icon display solution, power consumption of the terminal device can be reduced and a display camping ratio of a 5G network icon can be improved when the terminal device switches from a dual connectivity mode to a 4G connected mode. In addition, a quantity of network icon switching times can be reduced, and user experience can be improved.

Figure 3:
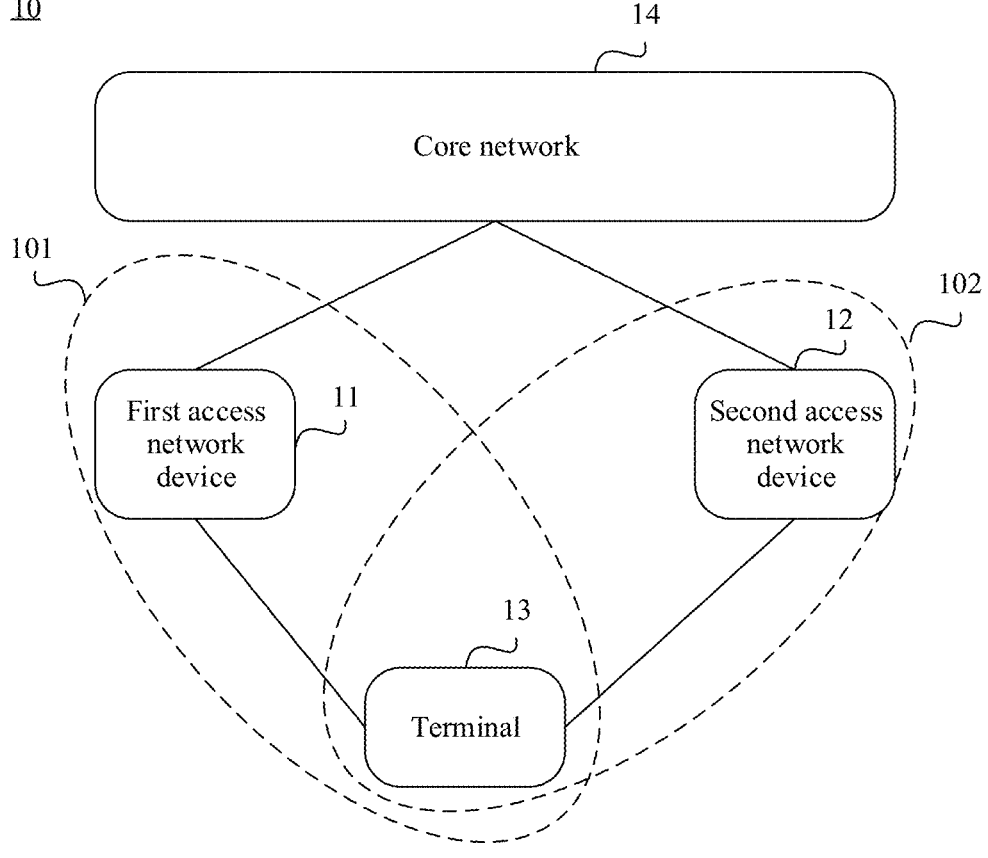
FIG. 3 is a schematic diagram of an architecture of a communication system according to an embodiment of this application.

The network icon display method provided in this embodiment of this application may be applied to a communication system 10 shown in FIG. 3. The communication system 10 is a network system formed by a first mobile communication network 101 and a second mobile communication network 102 through a non-standalone network. The first mobile communication network 101 and the second mobile communication network 102 belong to different network standards, and a network standard of the second mobile communication network is higher than a network standard of the first mobile communication network. For example, the first mobile communication network may be a 4G network, and the second mobile communication network may be a 5G network. Alternatively, the first mobile communication network may be a 5G network, and the second mobile communication network may be a 6G communication network or a future evolved mobile communication network. Alternatively, the first mobile communication network may be a 3G network, and the second mobile communication network may be a 5G communication network or a future evolved mobile communication network. Alternatively, both the first mobile communication network and the second mobile communication network are different future evolved mobile communication networks. Specific types of the first mobile communication network and the second mobile communication network are not limited in this embodiment of this application. For example, when the first mobile communication network is a 4G network, and the second mobile communication network is a 5G network, for an architecture of the communication system, refer to FIG. 1.

The communication system 10 includes a first access network device 11 of the first mobile communication network 101, a second access network device 12 of the second mobile communication network 102, a terminal device 13, and a core network 14. The core network 14 may include a plurality of network elements or a plurality of network devices. The terminal device 13 may establish a communication connection (for example, a radio resource control (RRC) connection) to the first access network device 11, to access the first mobile communication network 101. Alternatively, the terminal device 13 may separately establish mobile communication connections to the first access network device 11 and the second access network device 12, to establish a dual connection, so that the terminal device 13 accesses the first mobile communication network 101 and the second mobile communication network 102.

The access network device in embodiments of this application is a device for connecting the terminal device to a wireless network, and may be an eNB or an eNodeB in an LTE network; a gNB in a 5G network; or a base station, a broadband network gateway (BNG), an aggregation switch, a non-3rd Generation Partnership Project (3GPP) access device, or the like in a future evolved mobile communication network. This is not limited in embodiments of this application. In an embodiment, the base station in embodiments of this application may include base stations in various forms, for example, a macro base station, a micro base station (which is also referred to as a small cell), a relay station, and an access point. This is not limited in embodiments of this application.

It should be noted that types of access network devices (for example, the first access network device and the second access network device) in different mobile communication networks may be different. For example, when the first mobile communication network is a 4G network, the first access network device may be an eNB; or when the second mobile communication network is a 5G network, the second access network device may be a gNB.

In the communication system 10, the D+A icon display solution may be as follows: When the terminal device camps on a cell 1 of the first mobile communication network and is in an idle mode, if the cell 1 supports an NSA networking mode with the second mobile communication network, the terminal device displays a network icon of the second mobile communication network. Alternatively, if the cell 1 does not support the NSA networking mode with the second mobile communication network, the terminal device displays a network icon of the first mobile communication network. When the terminal device establishes connections to both the first mobile communication network and the second mobile communication network, that is, the terminal device establishes a dual connection, the terminal device displays the network icon of the second mobile communication network. When the terminal device establishes a connection to only the first mobile communication network, the terminal device displays the network icon of the first mobile communication network.

In this embodiment of this application, after the terminal device switches from the dual connectivity mode to a connected mode of the first mobile communication network, if a preset condition is met, for example, duration in which there is no user traffic is greater than or equal to preset timing duration, the terminal device requests the network side device to release an air interface connection (or referred to as releasing an air interface connection), so as to return to the idle mode, thereby reducing power consumption required by the terminal device to maintain the air interface connection.

In addition, in a case in which the D+A icon display solution is used, the method can further increase duration in which the terminal device displays the network icon of the second communication network, reduce a quantity of times of switching the network icon, and improve user experience.

The terminal device in this embodiment of this application may be a device configured to implement a wireless communication function, for example, may be a terminal device or a chip that can be used in the terminal device. The terminal device may be user equipment (UE), an access terminal device, a terminal device unit, a terminal device station, a mobile station, a mobile console, a remote station, a remote terminal device, a mobile device, a wireless communication device, a terminal device agent, a terminal device apparatus, or the like in the 4G network, the 5G network, or the future evolved mobile communication network. The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem processor, a vehicle-mounted device, a wearable device, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, a wireless terminal device in a smart home, or the like. The terminal device may be mobile or fixed.

In an embodiment, the access network device and the terminal device may also be referred to as communication apparatuses, and may be a general-purpose device or a dedicated device. This is not limited in this embodiment of this application.

Figure 4:
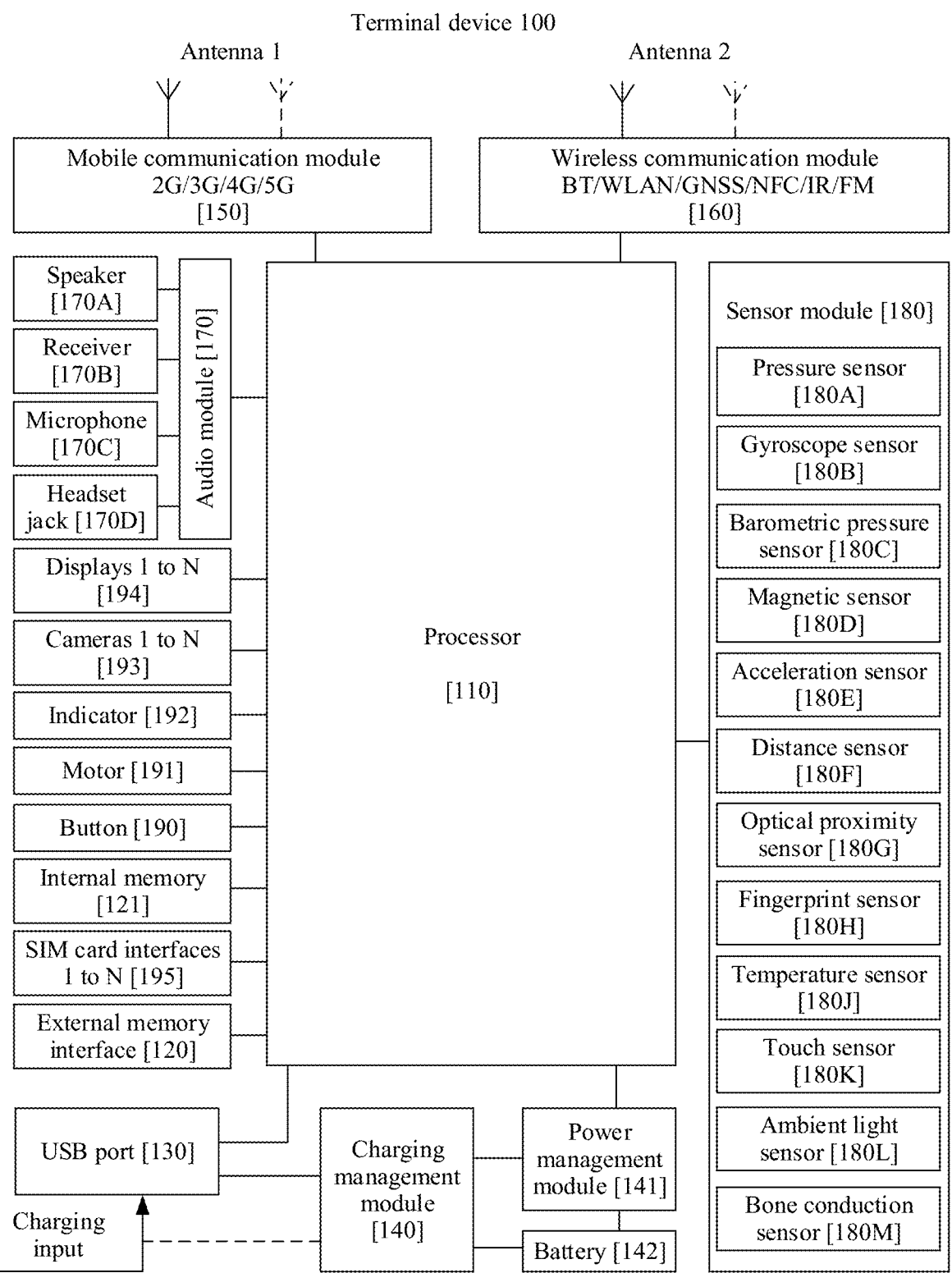
FIG. 4 is a schematic diagram of a hardware structure of a terminal device according to an embodiment of this application.

For example, FIG. 4 is a schematic diagram of a structure of a terminal device 100. The terminal device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The internal memory 121 may be configured to store computer-executable program code, and the executable program code includes instructions. The processor 110 runs the instructions stored in the internal memory 121, to perform various function applications of the electronic device 100 and data processing.

The mobile communication module 150 may provide a wireless communication solution that includes 2G/3G/4G/5G or the like and that is applied to the terminal device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to an application processor. The application processor outputs a sound signal by using the terminal device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

For example, in this embodiment of this application, the modem processor may obtain a network status of a mobile communication network of the terminal device 100, and report the network status to a controller. For example, the network status may include whether a cell of the first mobile communication network accessed by the terminal device supports a non-standalone network, whether the terminal device is currently in an idle mode or a connected mode, whether the terminal device establishes a dual connection, whether the terminal device detects signal coverage of the second mobile communication network, whether the terminal device has user traffic, whether duration in which the terminal device has no user traffic in the connected mode is greater than or equal to preset timing duration, or the like.

In addition, the modem processor may further obtain signal strength of the first mobile communication network and the second mobile communication network, to display a quantity of signal bars of the network icon based on the signal strength.

The terminal device 100 implements a display function by using a GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 100 may include one or N displays 194, where N is a positive integer greater than 1. For example, in this embodiment of this application, the display 194 may display a network icon such as a 5G network icon or a 4G network icon.

The SIM card interface 195 is used to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The terminal device 100 interacts with a network through the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

It can be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

In this embodiment of this application, the modem processor may obtain the network status of the mobile communication network of the terminal device 100, and report the obtained network status to the controller. By running the instructions stored in the internal memory 121, the controller determines a to-be-displayed target network icon based on the current network status of the terminal device 100, and indicates the display 194 to display the target network icon.

When determining, based on the network status, that the terminal device 100 in the connected mode meets a preset condition, for example, when duration in which the terminal device 100 has no user traffic is greater than or equal to preset timing duration, the controller requests the network side device to release an air interface connection, so that the terminal device 100 returns to the idle mode. Therefore, power consumption required by the terminal device 100 to maintain the air interface connection can be reduced. In addition, when the D+A icon display solution is used, duration in which the terminal device 100 displays the network icon of the second communication network can be further increased, a quantity of network icon switching times can be reduced, and user experience can be improved.

A software system of the terminal device 100 may use a layered architecture, an event-driven architecture, a micro-kernel architecture, a microservice architecture, or a cloud architecture. In embodiments of this application, an Android system with a layered architecture is used as an example to describe a software structure of the terminal device 100.

Figure 5:
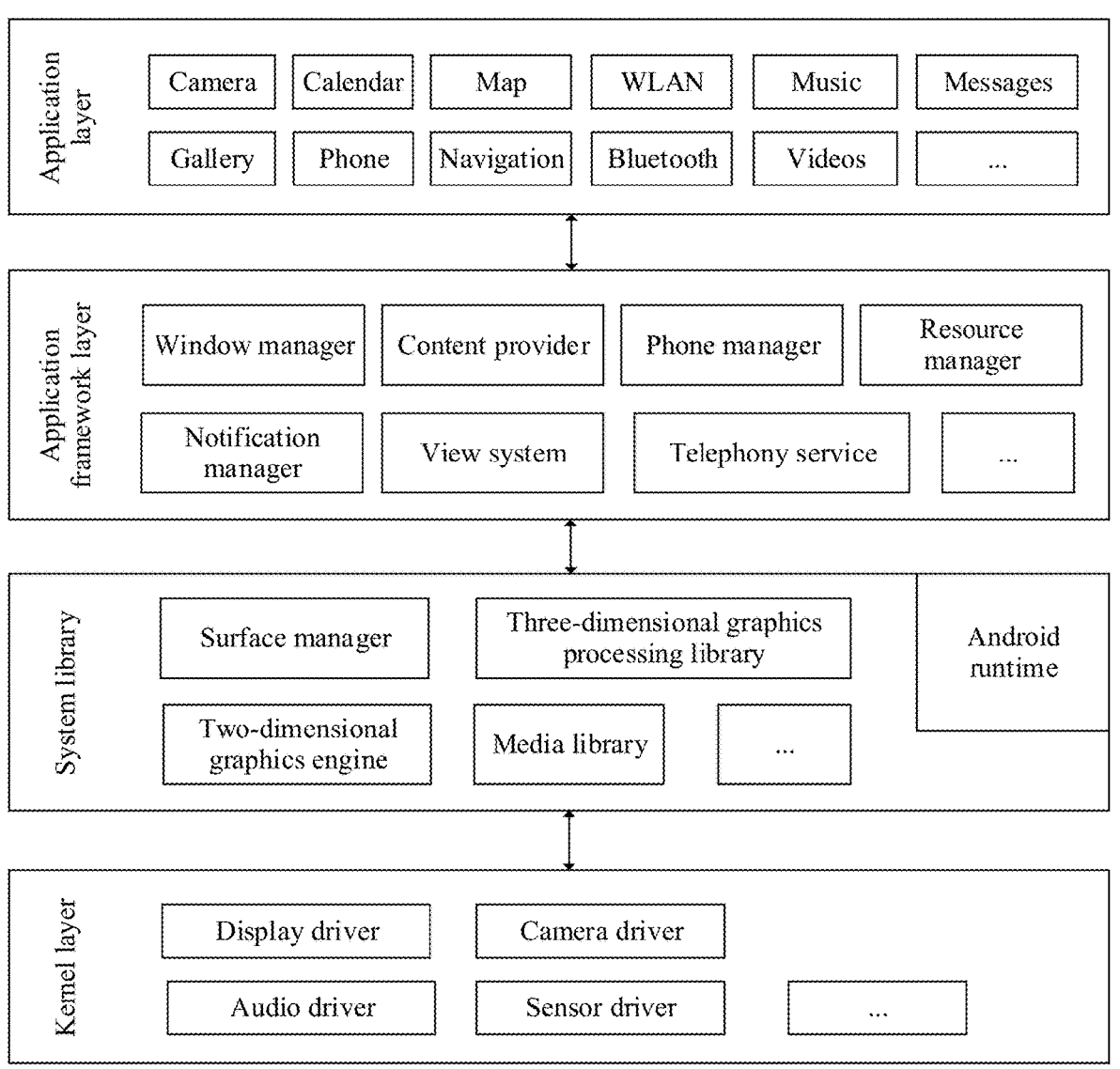
FIG. 5 is a schematic diagram of a software structure of a terminal device according to an embodiment of this application.

FIG. 5 is a block diagram of the software structure of the terminal device 100 according to an embodiment of this application. In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 5, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions. As shown in FIG. 5, the application framework layer may include a window manager, a content provider, a view system, a phone manager, a resource manager, a notification manager, a telephony service, or the like.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The kernel layer is a layer between hardware and software. The kernel layer includes at least a display driver, a camera driver, an audio driver, and a sensor driver. The hardware may include components such as the modem processor and the display.

The following describes an example of a working process of software and hardware of the terminal device 100 with reference to a network icon display scenario.

The modem processor at the hardware layer may obtain the network status of the terminal device 100, and report the network status to the telephony service at the application framework layer. The telephony service determines a to-be-displayed target network icon based on the network status of the terminal device 100, and indicates the display 194 at the hardware layer to display the target network icon. When determining, based on the network status, that duration in which the terminal device 100 has no user traffic in the connected mode is greater than or equal to the preset timing duration, the telephony service requests the network side device to release the air interface connection, so that the terminal device 100 returns to the idle mode. Therefore, the power consumption required by the terminal device 100 to maintain the air interface connection can be reduced. In addition, when the D+A icon display solution is used, the duration in which the terminal device 100 displays the network icon of the second communication network can be further increased, the quantity of network icon switching times can be reduced, and user experience can be improved.

For example, the first mobile communication network in the communication system shown in FIG. 3 is a 4G network, the second mobile communication network is a 5G network, the first access network device is a 4G base station, the second access network device is a 5G NR base station, and the terminal device is a mobile phone having the structures shown in FIG. 4 and FIG. 5. The network icon display method provided in this embodiment of this application is described by using an example of a target scenario in which an LTE cell on which the mobile phone currently camps supports an NSA networking mode and the LTE cell has NR signal coverage.

In an existing D+A icon display solution, in a target scenario, as described above, when the mobile phone switches from a dual connectivity mode to a 4G connected mode, a network icon displayed on the mobile phone is switched between 5G and 4G for a plurality of times. Consequently, user experience is poor.

For the existing D+A icon display solution, some operators formulate a delayed display solution, that is, the operators set a delayer 1 and a delayer 2 for extending display of a 5G network icon. For trigger conditions and termination conditions of the delayer 1 and the delayer 2, refer to Table 2.

TABLE 2

| Trigger condition of delayer 1 | Termination condition of delayer 1 |
|---|---|
| 4G idle mode –> 4G connected mode | Add an SCG; 2. 4G connected mode –> 4G idle mode; 3. Out of service; |
| Trigger condition of delayer 1 | Termination condition of delayer 1 4. Switch to a 2G/3G network; |
| Trigger condition of delayer 2 | Termination condition of delayer 2 |
| 4G connected mode + SCG –> 4G connected mode | 1. Add an SCG; 2. 4G connected mode –> 4G idle mode; 3. Out of service; 4. Switch to a 2G/3G network; |

As shown in Table 2, based on the trigger condition of the delayer 1, the delayer 1 is started when the mobile phone switches from the 4G idle mode to the 4G connected mode, and preset delay duration corresponding to the delayer 1 is T1. In the target scenario, before the delayer 1 expires, if the termination condition of the delayer 1 is not detected, the mobile phone continues to display the 5G network icon. Alternatively, if the termination condition of the delayer 1 is detected, the mobile phone stops timing of the delayer 1, and displays a network icon corresponding to the termination condition. For example, if the mobile phone detects, before the delayer 1 expires, that the network side configures the SCG, the delayer 1 stops timing, and the mobile phone displays the 5G network icon. For another example, if the mobile phone switches from the 4G connected mode to the 4G idle mode before the delayer 1 expires, the delayer 1 stops timing, and the mobile phone displays the 5G network icon. For another example, if the mobile phone is out of service before the delayer 1 expires, the delayer 1 stops timing, and the mobile phone displays no service and does not display a network icon. For another example, if the mobile phone switches to the 2G/3G network before the delayer 1 expires, the delayer 1 stops timing, and the mobile phone displays a 2G/3G network icon. For example, refer to FIG. 6A. At a changing point (1), due to a function of the delayer 1, the mobile phone continues to display the 5G network icon after switching from the 4G idle mode to the 4G connected mode. At a changing point (2), the mobile phone triggers to terminate the delayer 1 within effective duration of the delayer 1 after the 4G connected mode is switched to the dual connectivity mode, and displays a 5G network icon corresponding to the dual connectivity mode.

In the target scenario, an RRC connection may not be released for a long time when the mobile phone has no user traffic in the 4G connected mode due to reasons such as network-side faults. For example, after the delayer 1 expires, if the mobile phone is still in the 4G connected mode and the network side still does not release the RRC connection, the mobile phone switches from the 5G network icon to displaying the 4G network icon. In this case, a display time of the 5G network icon is short, and the mobile phone consumes a lot of power to maintain the RRC connection. For example, refer to FIG. 6B. At a changing point (1), the mobile phone continues to display the 5G network icon due to the function of the delayer 1. At an occasion (a), the delayer 1 expires, and the mobile phone switches from displaying the 5G network icon to displaying the 4G network icon. At a changing point (2), after the delayer 1 expires, the mobile phone switches from the 4G connected mode to the 4G connected mode+SCG. Therefore, the mobile phone switches from displaying the 4G network icon to displaying the 5G network icon, and the display duration of the 5G network icon is short.

Refer to Table 2. Based on the trigger condition of the delayer 2, the delayer 2 is started when the mobile phone switches from the dual connectivity mode to the 4G connected mode, and preset delay duration corresponding to the delayer 2 is T2. In the target scenario, before the delayer 2 expires, if the termination condition of the delayer 2 is not detected, the mobile phone continues to display the 5G network icon. Alternatively, if the termination condition of the delayer 2 is detected, the mobile phone stops timing of the delayer 2, and displays an icon corresponding to the termination condition. For example, if the mobile phone detects, before the delayer 2 expires, that the network side configures the SCG, the delayer 2 stops timing, and the mobile phone displays the 5G network icon. For another example, if the mobile phone switches from the 4G connected mode to the 4G idle mode before the delayer 2 expires, the delayer 2 stops timing, and the mobile phone displays the 5G network icon. For another example, if the mobile phone is out of service before the delayer 2 expires, the delayer 2 stops timing, and the mobile phone displays no service and does not display a network icon. For another example, if the mobile phone switches to the 2G/3G network before the delayer 2 expires, the delayer 2 stops timing, and the mobile phone displays the 2G/3G network icon. For example, refer to FIG. 6A. At a changing point (3), due to a function of the delayer 2, the mobile phone continues to display the 5G network icon after switching from the dual connectivity mode to the 4G connected mode. At a changing point (4), within effective duration of the delayer 2, the mobile phone switches from the 4G connected mode to the 4G idle mode, to trigger the delayer 2 to terminate, and the mobile phone displays the 5G network icon corresponding to the 4G idle mode.

In the target scenario, the RRC connection may not be released for a long time when the mobile phone has no user traffic in the 4G connected mode due to reasons such as network-side faults. For example, after the delayer 2 expires, if the mobile phone is still in the 4G connected mode and the network side still does not release the RRC connection, the mobile phone switches from the 5G network icon to displaying the 4G network icon. In this case, the 4G network icon and the 5G network icon may still change, and the mobile phone consumes a lot of power to maintain the RRC connection. For example, refer to FIG. 6B. At a changing point (3), the mobile phone continues to display the 5G network icon due to the function of the delayer 2. At an occasion (b), the delayer 2 expires, and the mobile phone switches from displaying the 5G network icon to displaying the 4G network icon. At a changing point (4), after the delayer 2 expires, the mobile phone switches from the 4G connected mode to the 4G idle mode. Therefore, the mobile phone switches from displaying the 4G network icon to displaying the 5G network icon.

It can be learned from FIG. 6B that, when an operator sets a delayer, the mobile phone still switches between the 5G network icon and the 4G network icon for a plurality of times. Display duration (namely, display camping time) of the 5G network icon is short, and a display camping ratio of the 5G network icon is low. A user may be misled that a 5G signal is unstable or a 5G capability of the mobile phone is poor, resulting in poor user experience.

In some embodiments of this application, in the target scenario, after the mobile phone switches from the dual connectivity mode to the 4G connected mode, namely, after the changing point (3), the mobile phone determines whether the preset condition is met. In other words, after the mobile phone is connected to an LTE cell (the LTE cell supports a non-standalone NSA networking mode) and an NR cell by using a dual connectivity technology, the mobile phone displays the 5G network icon, and determines whether the preset condition is met. After the preset condition is met, the mobile phone sends disconnection request information (namely, the first request information mentioned above) to a network side device. The disconnection request information is used to request to release the connection between the mobile phone and the LTE cell (that is, used to request the network side device to release the RRC connection). In response to releasing the connection to the LTE cell, the mobile phone enters the 4G idle mode, and displays the 5G network icon.

In other words, if the preset condition is met, the mobile phone actively requests the network side device to release the RRC connection, so that the mobile phone returns to the 4G idle mode and displays the corresponding 5G network icon. Therefore, the display camping ratio of the 5G network icon can be improved, and user experience can be improved. In addition, the mobile phone actively requests the network side device to release the RRC connection. This can further avoid a case in which an RRC is not released due to a network exception (for example, a network configuration parameter mismatch or a network fault) after the mobile phone switches to the 4G connected mode or an RRC is not released even if there is no service for a long time. This can reduce power consumption required by the mobile phone to maintain the air interface connection, and save power of the mobile phone.

For example, the preset condition includes one or more of the following items: a condition (1): The mobile phone enters a screen-off state; a condition (2): The mobile phone enters a power saving mode or an ultra power saving mode; a condition (3): A temperature of the mobile phone is greater than or equal to a preset threshold 1; a condition (4): The power of the mobile phone is less than or equal to a preset threshold 2; a condition (5): An uplink rate of the mobile phone is less than or equal to a preset threshold 3; a condition (6): The mobile phone runs only an application in a whitelist; and the like. In some other embodiments, the condition (1) to the condition (6) further include that duration is greater than or equal to preset duration. For example, the condition (1) may be replaced with that duration after the mobile phone enters the screen-off state is greater than or equal to preset duration a, and the condition (5) may be replaced with that duration in which the uplink rate of the mobile phone is less than or equal to the preset threshold 3 is greater than or equal to preset duration b.

For another example, the preset condition includes a condition (7): The mobile phone determines that duration in which there is no user traffic (or no user service) after switching to the 4G connected mode is greater than or equal to the preset timing duration. It can be learned from a specification of a transmission control protocol/internet protocol (TCP/IP) or the like that user data is carried through a data radio bearer (DRB), and system information is carried through a signaling radio bearer (SRB). In this embodiment of this application, that there is no user traffic means that the mobile phone does not detect, within preset duration 1, user data carried through the DRB. The user traffic is data traffic of a user service, and there is no user service when there is no user traffic. The preset duration 1 is short, for example, may be 0.5 s or 1 s.

In the following embodiment, an example in which the preset condition is the foregoing condition (7) is mainly used for description.

After the changing point (3) of switching from the dual connectivity mode to the 4G connected mode, the mobile phone monitors whether the user traffic exists. If determining that the duration in which there is no user traffic after the 4G connected mode is switched to is greater than or equal to the preset timing duration TB, the mobile phone actively requests the network side device to release the RRC connection, so that the mobile phone returns to the 4G idle mode and displays the corresponding 5G network icon. For example, when determining to switch to the 4G connected mode and have no user traffic, the mobile phone may start a timer B, and preset timing duration corresponding to the timer B is TB.

Generally, the network side releases the SCG of the mobile phone only when the mobile phone has no user traffic, or the mobile phone triggers the network side to release the SCG only when the mobile phone has no user traffic. In this way, the mobile phone switches from the dual connectivity mode to the 4G connected mode. Therefore, after the mobile phone switches from the dual connectivity mode to the 4G connected mode, the mobile phone is usually in a state of no user traffic. Therefore, in this embodiment of this application, after switching from the dual connectivity mode to the 4G connected mode, the mobile phone may detect that there is no user traffic, and may start the timer B to start timing. In other words, after switching from the dual connectivity mode to the 4G connected mode, the mobile phone may start the timer B to start timing. It may be understood that start time of the timer B and the delayer 2 is basically the same.

In a case in which the operator sets the delayer 2 and the SCG is released only when the mobile phone has no user traffic, if TB is less than or equal to the preset delay duration T2 corresponding to the delayer 2, because a time period of TB after the changing point (3) is within a time period of T2 corresponding to the delayer 2, the mobile phone displays the 5G network icon. After the time period of TB, the mobile phone returns to the 4G idle mode to trigger termination of the delayer 2, and the mobile phone displays the 5G network icon corresponding to the 4G idle mode.

Figure 7A:
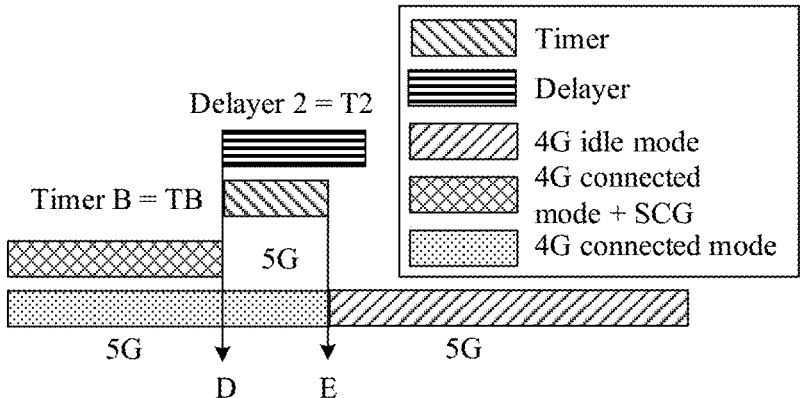
FIG. 7A is a schematic diagram of another status and icon switching effect according to an embodiment of this application.

For example, refer to FIG. 7A. On an occasion D, the mobile phone switches from the dual connectivity mode to the 4G connected mode, and the delayer 2 is started. Therefore, the mobile phone continues to display the 5G network icon. On an occasion E, when the timer B expires within the effective duration of the delayer 2, the mobile phone switches from the 4G connected mode to the 4G idle mode, the delayer 2 is triggered to terminate, and the mobile phone displays the 5G network icon corresponding to the 4G idle mode. Therefore, compared with the solution shown in FIG. 6B, after the mobile phone switches from the dual connectivity mode to the 4G connected mode, the network icon is not switched, and the 5G network icon can be continuously displayed. Therefore, the mobile phone can reduce a quantity of network icon switching times, improve a display camping ratio of the 5G network icon, and improve user experience. In addition, the mobile phone releases the RRC connection after the preset timing duration TB. This can avoid a case in which an RRC is not released due to a network exception (for example, a network configuration parameter mismatch or a network fault) after the mobile phone switches to the 4G connected mode or an RRC is not released even if there is no service for a long time. This can reduce power consumption required by the mobile phone to maintain the air interface connection, and save power of the mobile phone.

Figure 7B:
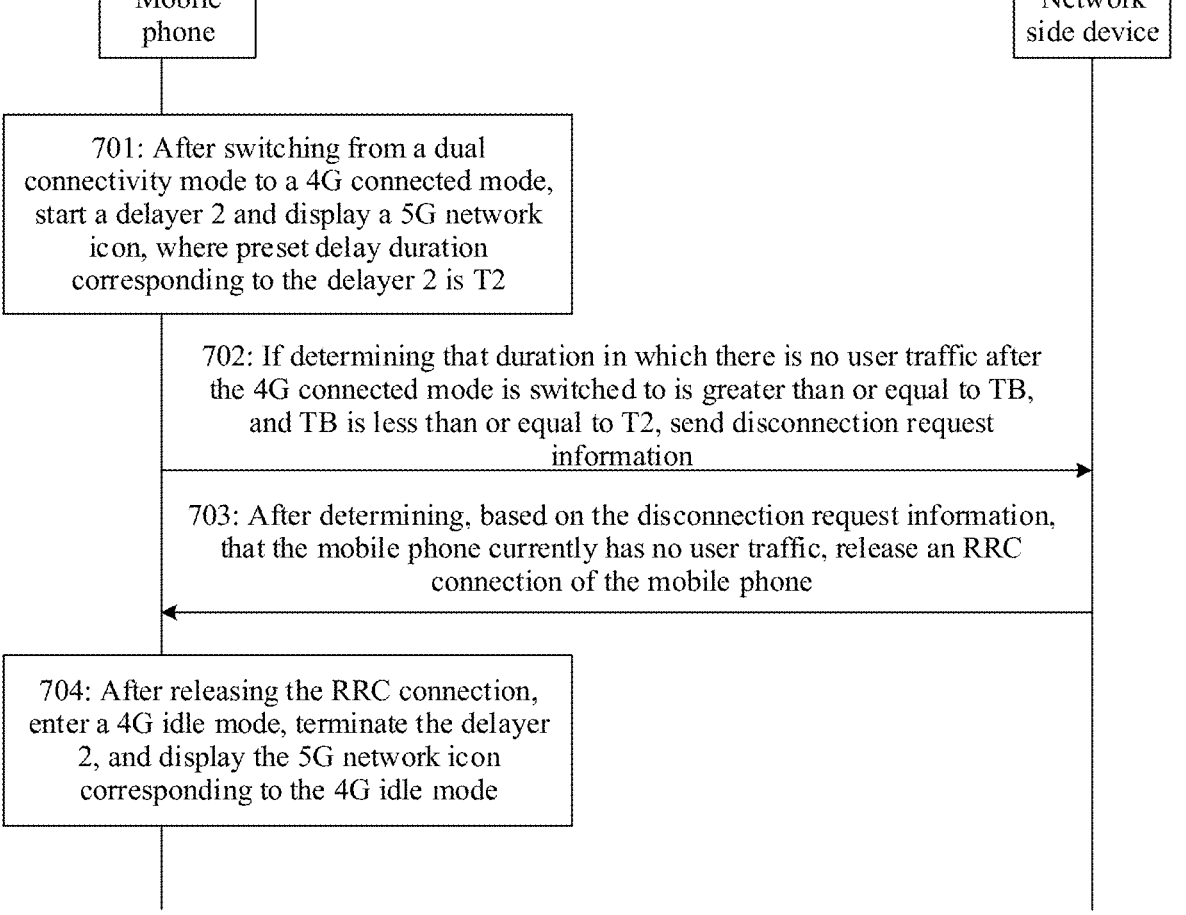
FIG. 7B is a flowchart of a network icon display method according to an embodiment of this application.

For example, in the target scenario, TB is less than or equal to T2. Refer to FIG. 7B. The method may include the following operations.

701: After switching from the dual-connected mode to the 4G connected mode, the mobile phone starts the delayer 2 and displays the 5G network icon, where the preset delay duration corresponding to the delayer 2 is T2.

For example, after the network side releases the SCG or the mobile phone triggers the network side to release the SCG, for example, after an LTE base station sends SCGFailureInformationNR to the mobile phone or the mobile phone reports SCGFailureInformationNR-r15, the mobile phone switches from the dual connectivity mode to the 4G connected mode.

In some embodiments, the SCG may be released when the mobile phone meets at least one of the following preset conditions: (a) The mobile phone is in a screen-off state; (b) A data transmission rate of the mobile phone is less than or equal to a preset rate; (c) A temperature of the mobile phone is greater than or equal to a preset threshold 1; (d) The mobile phone runs only an application (for example, Phone) in a whitelist; (e) The power of the mobile phone is less than or equal to a preset threshold 2; (f) A 5G service executed by the mobile phone through the 5G network has been stopped; and the like

702: If the mobile phone determines that the duration in which there is no user traffic after the 4G connected mode is switched to is greater than or equal to TB, and TB is less than or equal to T2, the mobile phone sends disconnection request information to the network side device, where the disconnection request information is used to indicate that the mobile phone currently has no user traffic.

In some embodiments, when determining that there is no user traffic after the 4G connected mode is switched to, the mobile phone may start the timer B to record the duration in which there is no user traffic.

The disconnection request information is used to request the network side device to release the RRC connection. The network side device may be an access network device, a core network device, or the like. For example, the disconnection request information may be a tracking area update request message, namely, a TAU message.

703: After determining, based on the disconnection request information, that the mobile phone currently has no user traffic, the network side device releases the RRC connection of the mobile phone.

After determining, based on the disconnection request information, that the mobile phone currently has no user traffic, the network side device may release the RRC connection of the mobile phone. The network side device may send disconnection indication information to the mobile phone to indicate to release the RRC connection of the mobile phone. For example, after receiving the tracking area update request message, the network side device may reply to the mobile phone with a tracking area accept message, and send an RRC connection release message to the mobile phone, to indicate to release the RRC connection of the mobile phone.

704: After releasing the RRC connection, the mobile phone enters the 4G idle mode, terminates the delayer 2, and displays the 5G network icon corresponding to the 4G idle mode.

After receiving the disconnection indication information of the network side device, the mobile phone releases the RRC connection, so as to enter the 4G idle mode. After entering the 4G idle mode, the mobile phone terminates the delayer 2, and displays the 5G network icon corresponding to the 4G idle mode.

In other words, after an NR SCG is released and the mobile phone switches from the dual connectivity mode to the 4G connected mode, the timer B and the delayer 2 are started, the 5G network icon is displayed, and the preset timing duration TB corresponding to the timer is less than or equal to the preset delay duration T2 corresponding to the delayer 2. If the duration in which the mobile phone has no user traffic in the 4G connected mode is greater than or equal to TB, and the timer B stops timing before the delayer 2, after the timer B stops timing, the mobile phone sends the disconnection request information to the network side device, to request to release the RRC connection. The network side device may send the disconnection indication information to the mobile phone to indicate to release the RRC connection. After releasing the RRC connection, the mobile phone enters the 4G idle mode, displays the 5G network icon, and stops timing of the delayer 2.

In addition, in the conventional technology, within the duration T2 after the mobile phone switches from the dual connectivity mode to the 4G connected mode, the mobile phone is in the 4G connected mode but displays a 5G network icon, and the 5G network icon does not match the 4G connected mode. However, in this embodiment of this application, when TB is less than T2, the mobile phone returns to the 4G idle mode after TB, to display the 5G network icon that matches the 4G idle mode. In other words, a network icon displayed by the mobile phone before T2 and after TB matches a current status of the mobile phone. Therefore, the network icon is displayed more accurately.

In a case in which the operator sets the delayer 2 and the SCG is released only when the mobile phone has no user traffic, if TB is greater than the preset delay duration T2 corresponding to the delayer 2, because the time period of TB after the mobile phone switches from the dual connectivity mode to the 4G connected mode is within the time period of T2 corresponding to the delayer 2, the mobile phone displays the 5G network icon. The mobile phone displays the 5G network icon after the preset delay duration T2 corresponding to the delayer 2 and before the time period of TB. After TB, the mobile phone returns to the 4G idle mode, triggers the delayer 2 to terminate, and displays the 5G network icon corresponding to the 4G idle mode.

For example, refer to FIG. 8A. On an occasion D, the mobile phone switches from the dual connectivity mode to the 4G connected mode, the delayer 2 is started, and therefore the mobile phone continues to display the 5G network icon. On an occasion E, the delayer 2 expires, and the mobile phone is still in the 4G connected mode, and therefore displays the 4G network icon. On an occasion F, the timer B expires, and the mobile phone switches to the 4G idle mode, and switches from displaying the 4G network icon to displaying the 5G network icon corresponding to the 4G idle mode. Therefore, compared with the solution shown in FIG. 6B, after switching from the dual connectivity mode to the 4G connected mode, the mobile phone may display the 5G network icon for a longer time, thereby improving a display camping ratio of the 5G network icon and improving user experience. In addition, the mobile phone releases the RRC connection after the preset timing duration TB. This can avoid a case in which an RRC is not released for a long time due to reasons such as a network exception or the like. This can reduce power consumption required by the mobile phone to maintain the air interface connection, and save power of the mobile phone.

Figure 8B:
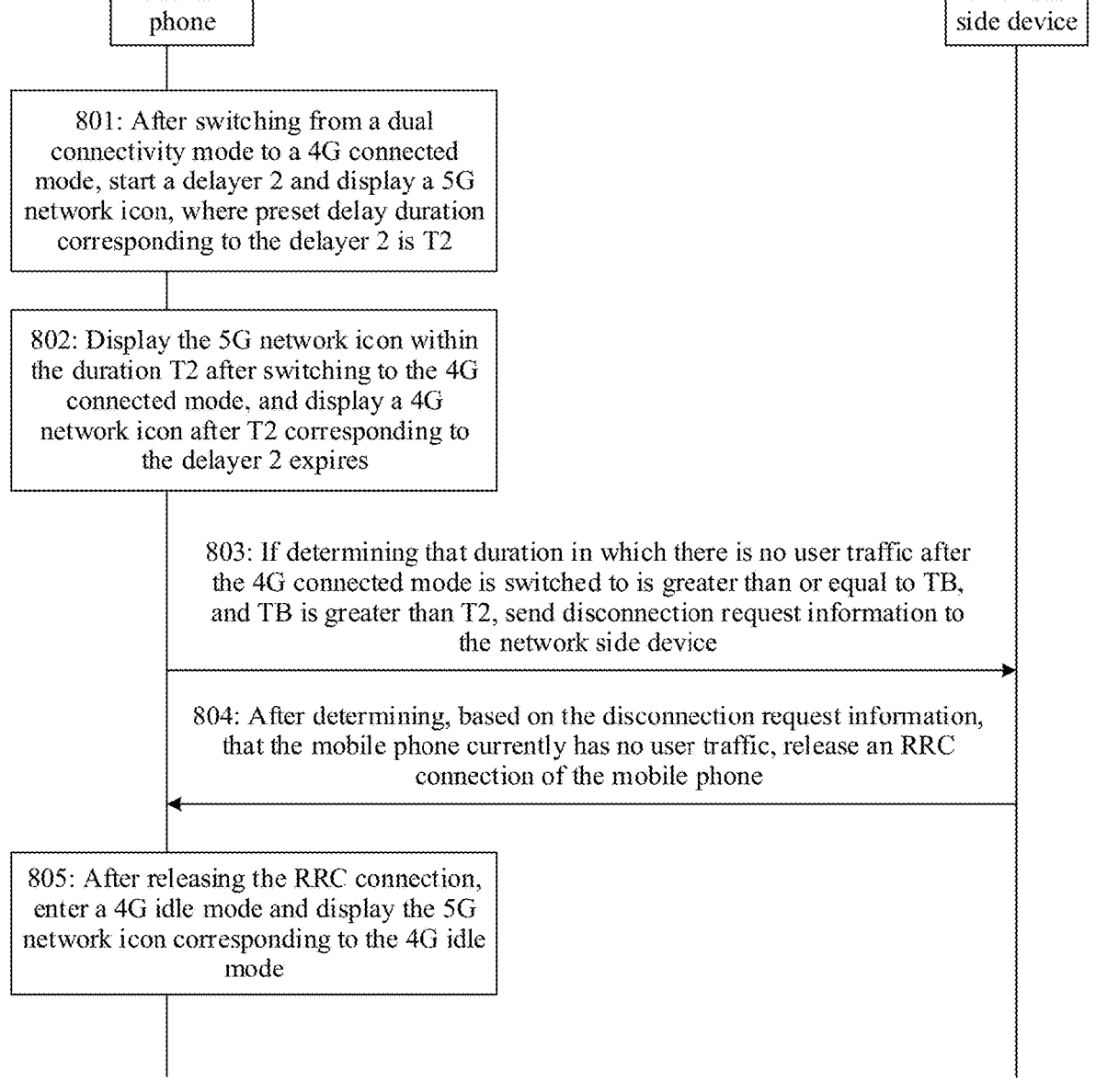
FIG. 8B is a flowchart of a network icon display method according to an embodiment of this application.

For example, in the target scenario, TB is greater than T2. Refer to FIG. 8B. The method may include the following operations.

801: After switching from the dual connectivity mode to the 4G connected mode, the mobile phone starts the delayer 2 and displays the 5G network icon, where the preset delay duration corresponding to the delayer 2 is T2.

802: The mobile phone displays the 5G network icon within the duration T2 after switching to the 4G connected mode, and displays the 4G network icon after T2 corresponding to the delayer 2 expires.

803: If the mobile phone determines that the duration in which there is no user traffic after the 4G connected mode is switched to is greater than or equal to TB, and TB is greater than T2, the mobile phone sends disconnection request information to the network side device.

804: After determining, based on the disconnection request information, that the mobile phone currently has no user traffic, the network side device releases the RRC connection of the mobile phone.

805: After releasing the RRC connection, the mobile phone enters the 4G idle mode and displays the 5G network icon corresponding to the 4G idle mode.

In other words, after an NR SCG is released and the mobile phone switches from the dual connectivity mode to the 4G connected mode, the timer B and the delayer 2 are started, the 5G network icon is displayed, and the preset timing duration TB corresponding to the timer is greater than the preset delay duration T2 corresponding to the delayer 2. The mobile phone displays the 4G network icon after the delayer 2 stops timing. If the duration in which the mobile phone has no user traffic in the 4G connected mode is greater than or equal to TB, after the timer B stops timing, the mobile phone sends the disconnection request information to the network side device, to request to release the RRC connection. The network side device may send disconnection indication information to the mobile phone to indicate to release the RRC connection. After releasing the RRC connection, the mobile phone enters the 4G idle mode and displays the 5G network icon.

In some embodiments, in a case in which the operator sets the delayer 2 and the SCG is released only when the mobile phone has no user traffic, the timer B may be the delayer 2, and TB is equal to T2. In this way, the mobile phone displays the 5G network icon within the delay duration of T2, returns to the 4G idle mode after T2, and displays the 5G network icon corresponding to the 4G idle mode.

Figure 9A:
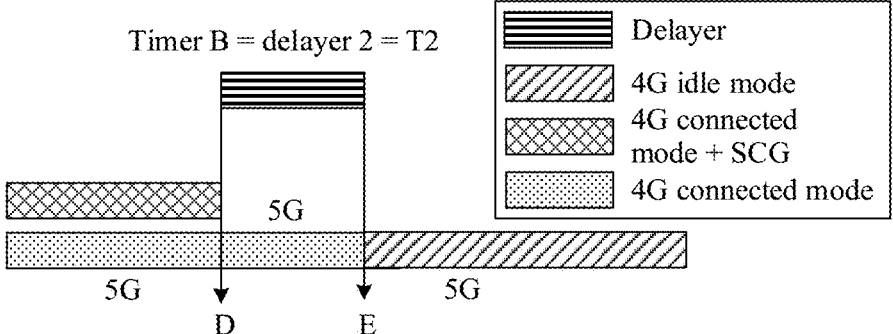
FIG. 9A is a schematic diagram of another status and icon switching effect according to an embodiment of this application.

For example, refer to FIG. 9A. On an occasion D, the mobile phone switches from the dual connectivity mode to the 4G connected mode, the delayer 2 is started, and therefore the mobile phone continues to display the 5G network icon. On an occasion E, the delayer 2 expires, and the mobile phone is still in the 4G connected mode, and therefore displays the 4G network icon. On an occasion F, the timer B expires, and the mobile phone switches to the 4G idle mode, and switches from displaying the 4G network icon to displaying the 5G network icon corresponding to the 4G idle mode. In this way, compared with the solution shown in FIG. 6B, after the mobile phone switches from the dual connectivity mode to the 4G connected mode, the network icon is not switched, and the 5G network icon can be continuously displayed. Therefore, the mobile phone can reduce a quantity of network icon switching times, improve a display camping ratio of the 5G network icon, and improve user experience. In addition, the mobile phone releases the RRC connection after the preset timing duration TB. This can avoid a case in which an RRC is not released for a long time due to reasons such as a network exception or the like. This can reduce power consumption required by the mobile phone to maintain the air interface connection, and save power of the mobile phone.

Figure 9B:
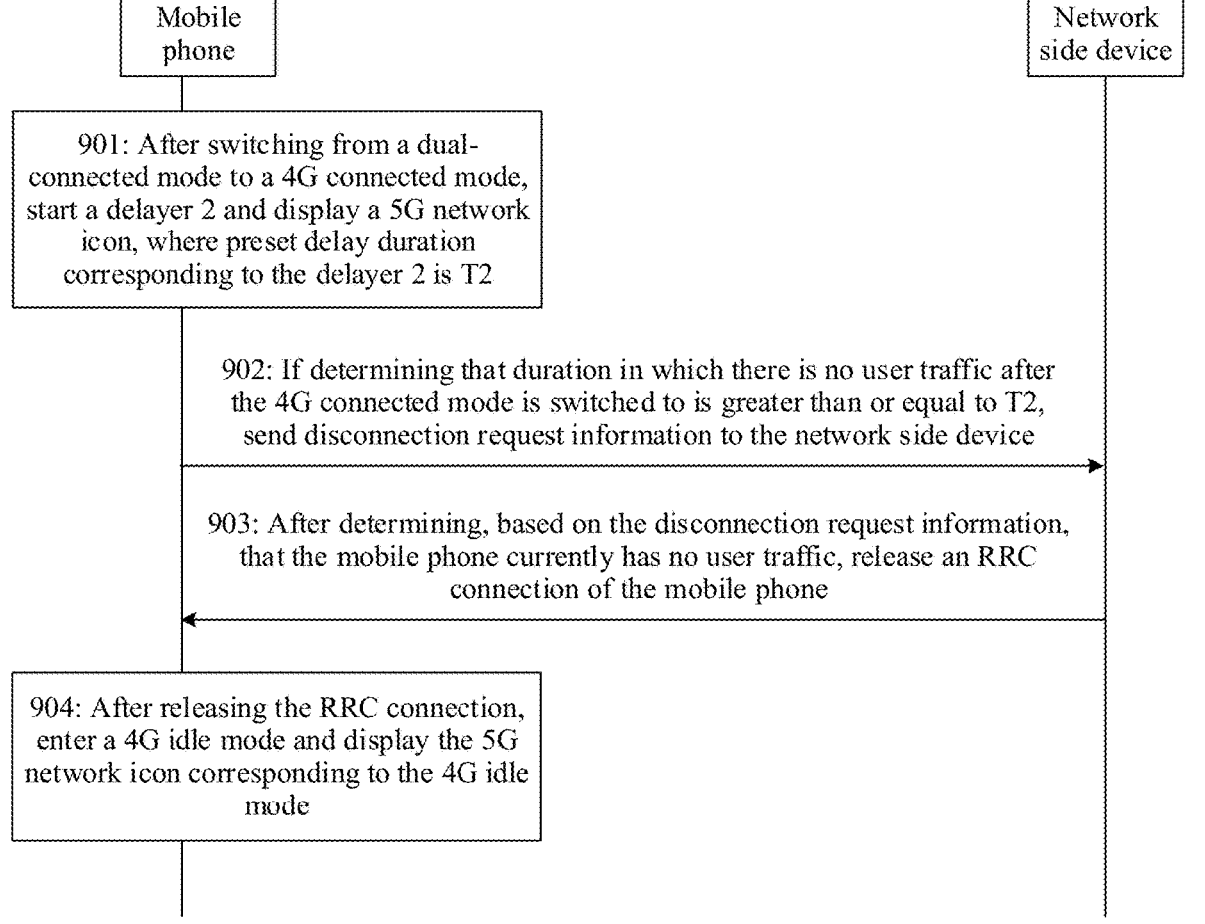
FIG. 9B is a flowchart of a network icon display method according to an embodiment of this application.

For example, in the target scenario, the timer B is the delayer 2. Refer to FIG. 9B. The method may include the following operations.

901: After switching from the dual connectivity mode to the 4G connected mode, the mobile phone starts the delayer 2 and displays the 5G network icon, where the preset delay duration corresponding to the delayer 2 is T2.

902: If the mobile phone determines that the duration in which there is no user traffic after the 4G connected mode is switched to is greater than or equal to T2, the mobile phone sends disconnection request information to the network side device.

903: After determining, based on the disconnection request information, that the mobile phone currently has no user traffic, the network side device releases the RRC connection of the mobile phone.

904: After releasing the RRC connection, the mobile phone enters the 4G idle mode and displays the 5G network icon corresponding to the 4G idle mode.

That is, after an NR SCG is released and the mobile phone switches from the dual connectivity mode to the 4G connected mode, the mobile phone starts the delayer 2. If the duration in which the mobile phone has no user traffic in the 4G connected mode is greater than or equal to T2, after the delayer 2 stops timing, the mobile phone sends the disconnection request information to the network side device, to request to release the RRC connection. The network side device may send disconnection indication information to the mobile phone to indicate to release the RRC connection. After releasing the RRC connection, the mobile phone enters the 4G idle mode and displays the 5G network icon.

In a case in which the operator does not set the delayer 2 and the SCG is released only when the mobile phone has no user traffic, after the mobile phone switches from the dual connectivity mode to the 4G connected mode, if determining that the duration in which there is no user traffic after the 4G connected mode is switched to is greater than or equal to the preset timing duration TB, the mobile phone actively requests the network side device to release the RRC connection, so as to return to the 4G idle mode and display the 5G network icon. In this way, the mobile phone displays the 4G network icon within a time period of TB after switching to the 4G connected mode, returns to the 4G idle mode after TB, and displays the 5G network icon corresponding to the 4G idle mode.

Figure 10A:
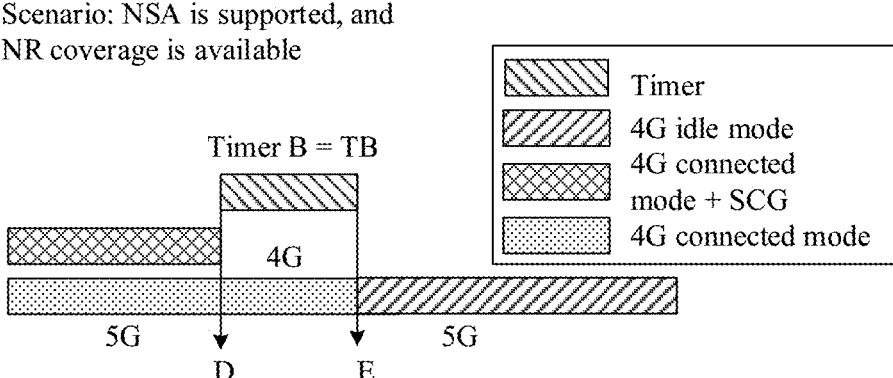
FIG. 10A is a schematic diagram of another status and icon switching effect according to an embodiment of this application.

For example, refer to FIG. 10A. On an occasion D, the mobile phone switches from the dual connectivity mode to the 4G connected mode, and switches from displaying the 5G network icon to displaying the 4G network icon. On an occasion E, the timer B expires, and the mobile phone switches to the 4G idle mode, and switches from displaying the 4G network icon to displaying the 5G network icon corresponding to the 4G idle mode. Therefore, compared with the solution shown in FIG. 2, after switching from the dual connectivity mode to the 4G connected mode, the mobile phone may display the 5G network icon for a longer time, thereby improving a display camping ratio of the 5G network icon and improving user experience. In addition, the mobile phone releases the RRC connection after the preset timing duration TB. This can avoid a case in which an RRC is not released for a long time due to reasons such as a network exception or the like. This can reduce power consumption required by the mobile phone to maintain the air interface connection, and save power of the mobile phone.

Figure 10B:
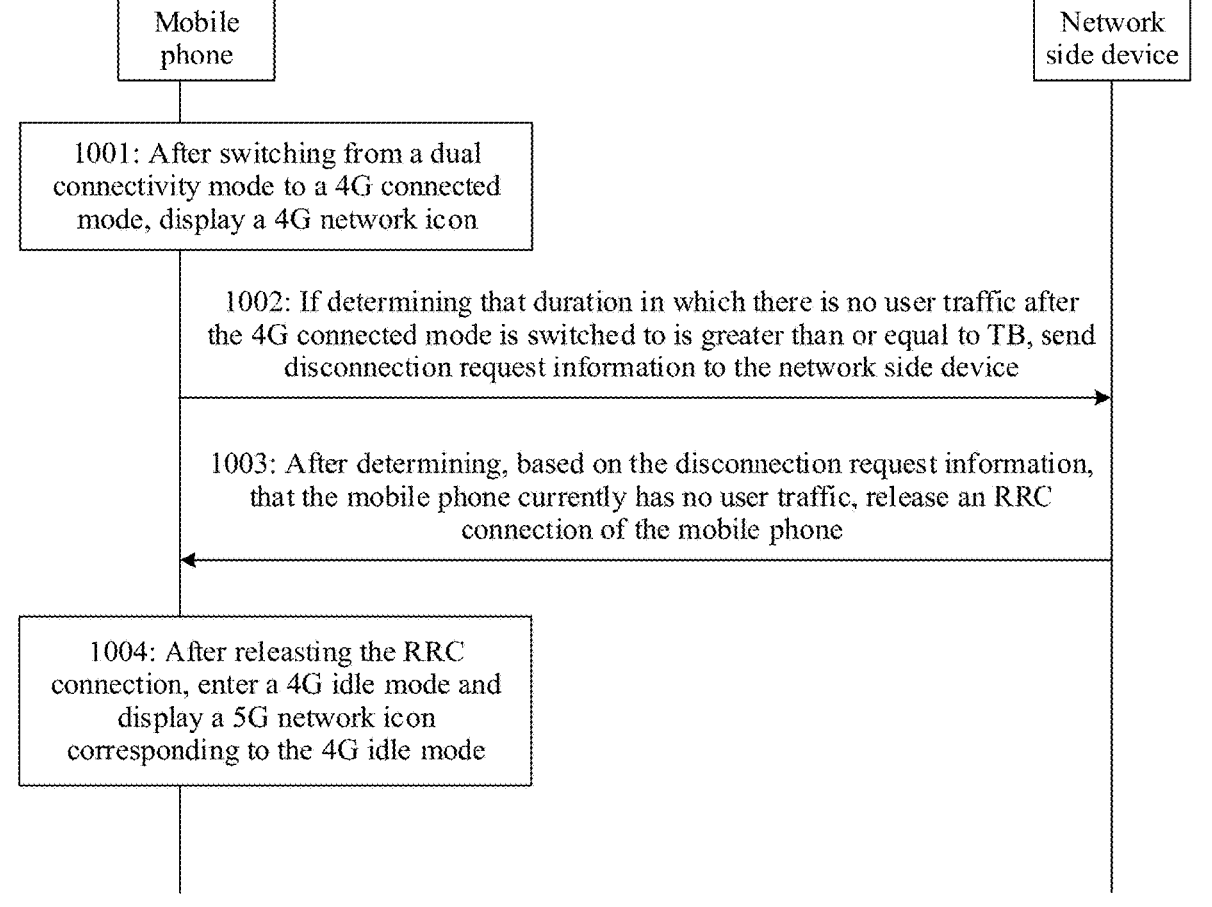
FIG. 10B is a flowchart of a network icon display method according to an embodiment of this application.

For example, in the target scenario, no delayer 2 is set. Refer to FIG. 10B. The method may include the following operations.

1001: After switching from the dual connectivity mode to the 4G connected mode, the mobile phone displays the 4G network icon.

1002: If the mobile phone determines that the duration in which there is no user traffic after the 4G connected mode is switched to is greater than or equal to TB, the mobile phone sends disconnection request information to the network side device.

1003: After determining, based on the disconnection request information, that the mobile phone currently has no user traffic, the network side device releases the RRC connection of the mobile phone.

1004: After releasing the RRC connection, the mobile phone enters the 4G idle mode and displays the 5G network icon corresponding to the 4G idle mode.

In other words, after an NR SCG is released and the mobile phone switches from the dual connectivity mode to the 4G connected mode, the 4G network icon is displayed and the timer B is started. If the duration in which the mobile phone has no user traffic in the 4G connected mode is greater than or equal to TB, after the timer B stops timing, the mobile phone sends the disconnection request information to the network side device, to request to release the RRC connection. The network side device may send disconnection indication information to the mobile phone to indicate to release the RRC connection. After releasing the RRC connection, the mobile phone enters the 4G idle mode and displays the 5G network icon.

In addition, in the foregoing target scenario, by using the solution described in the foregoing embodiment, when duration of a connected mode without user traffic is greater than or equal to the preset timing duration TB, the mobile phone may actively request the network side device to release the RRC connection. In this way, the mobile phone can actively enter an idle mode and display the 5G network icon as soon as possible, to avoid a case in which an RRC is not released for a long time due to reasons such as a network exception or the like, reduce power consumption required by the mobile phone to maintain the air interface connection, save power of the mobile phone, improve a display camping ratio of the 5G network icon, and improve user experience.

In some cases, the SCG is not released only when the mobile phone has no user traffic. After the mobile phone switches from the dual connectivity mode to the 4G connected mode, user traffic may still exist. Therefore, after switching from the dual connectivity mode to the 4G connected mode, the mobile phone may not start the timer B immediately. Instead, the mobile phone starts the timer B only after no user traffic is detected. In this case, after the mobile phone switches from the dual connectivity mode to the 4G connected mode, regardless of whether the operator sets the delayer 2, when the duration of the connected mode without user traffic is greater than or equal to the preset timing duration TB, the mobile phone may actively request the network side device to release the RRC connection. In this way, the mobile phone can actively enter the idle mode and display the 5G network icon as soon as possible, to avoid a case in which an RRC is not released for a long time due to reasons such as a network exception or the like after the mobile phone switches to the 4G connected mode, reduce power consumption required by the mobile phone to maintain the air interface connection, save power of the mobile phone, improve a display camping ratio of the 5G network icon, and improve user experience.

For example, refer FIG. 11. On an occasion D, the mobile phone switches from the dual connectivity mode to the 4G connected mode, and switches from displaying the 5G network icon to displaying the 4G network icon. On an occasion F, the mobile phone detects that there is no user traffic, starts the timer B, and is still in the 4G connected mode, so as to display the 4G network icon. On an occasion E, the timer B expires, and the mobile phone is triggered to switch from the 4G connected mode to the 4G idle mode, and switch from displaying the 4G network icon to displaying the 5G network icon corresponding to the 4G idle mode. The mobile phone actively requests to release the RRC connection after the preset timing duration TB after the mobile phone switches to the 4G connected mode. This can avoid a case in which an RRC is not released for a long time due to reasons such as a network exception or the like after the mobile phone switches to the 4G connected mode, reduce power consumption required by the mobile phone to maintain the air interface connection, and save power of the mobile phone. In addition, compared with the solution shown in FIG. 2, after switching from the dual connectivity mode to the 4G connected mode, the mobile phone may display the 5G network icon for a longer time, thereby improving a display camping ratio of the 5G network icon and improving user experience.

In other words, when the delayer 2 is not set, after an NR SCG is released and the mobile phone switches from the dual connectivity mode to the 4G connected mode, the 4G network icon is displayed. The mobile phone starts the timer B after detecting that there is no user traffic in the 4G connected mode. If the mobile phone determines that the duration in which there is no user traffic in the 4G connected mode is greater than or equal to TB, after the timer B stops timing, the mobile phone sends the disconnection request information to the network side device, to request to release the RRC connection. The network side device may send the disconnection indication information to the mobile phone to indicate to release the RRC connection. After releasing the RRC connection, the mobile phone enters the 4G idle mode and displays the 5G network icon.

It should be noted that, when the operator sets the delayer 2, the mobile phone displays the 5G network icon within an effective time period of the delayer 2 after switching to the 4G connected mode (namely, within a time period in which the delayer 2 does not expire and is not terminated by the termination condition after being started).

For example, when the delayer 2 is set, after the NR SCG is released and the mobile phone switches from the dual connectivity mode to the 4G connected mode, the delayer 2 is started and the 5G network icon is displayed. The delayer 2 corresponds to the preset delay duration T2. If the mobile phone detects that there is no user traffic in the 4G connected mode, the mobile phone starts the timer B. The timer B corresponds to the preset timing duration TB. If the duration in which the mobile phone has no user traffic in the 4G connected mode is greater than or equal to TB, and the timer B stops timing before the delayer 2, after the timer B stops timing, the mobile phone sends the disconnection request information to the network side device, to request to release the RRC connection. The network side device may send the disconnection indication information to the mobile phone to indicate to release the RRC connection. After releasing the RRC connection, the mobile phone enters the 4G idle mode, displays the 5G network icon, and stops timing of the delayer 2.

Alternatively, if the delayer 2 stops timing before the timer B, the mobile phone displays the 4G network icon after the delayer 2 stops timing. If the duration in which the mobile phone has no user traffic in the 4G connected mode is greater than or equal to TB, after the timer B stops timing, the mobile phone sends the disconnection request information to the network side device, to request to release the RRC connection. The network side device may send the disconnection indication information to the mobile phone to indicate to release the RRC connection. After releasing the RRC connection, the mobile phone enters the 4G idle mode and displays the 5G network icon.

In addition, in this embodiment of this application, after the changing point (1) for switching from the 4G idle mode to the 4G connected mode, the mobile phone may also determine whether the preset condition is met. After the preset condition is met, the mobile phone sends disconnection request information to the network side device, where the disconnection request information is used to request to release the connection between the mobile phone and the LTE cell. In response to releasing the connection to the LTE cell, the mobile phone enters the 4G idle mode, and displays the 5G network icon.

In other words, if the preset condition is met, the mobile phone actively requests the network side device to release the RRC connection, so that the mobile phone returns to the 4G idle mode and displays the corresponding 5G network icon. In this way, the mobile phone actively requests the network side device to release the RRC connection, so as to return to the 4G idle mode and display the corresponding 5G network icon. This can improve a display camping ratio of the 5G network icon, and improve user experience. In addition, the mobile phone actively requests the network side device to release the RRC connection. This can further avoid a case in which an RRC is not released due to a network exception after the mobile phone switches to the 4G connected mode or an RRC is not released even if there is no service for a long time. This can reduce power consumption required by the mobile phone to maintain the air interface connection, and save power of the mobile phone.

For example, the preset condition includes one or more of the condition (1) to the condition (6). For another example, the preset condition includes the foregoing condition (7).

In the following embodiment, an example in which the preset condition is the foregoing condition (7) is mainly used for description.

After the changing point (1) for switching from the 4G idle mode to the 4G connected mode, the mobile phone may actively request the network side device to release the RRC connection when duration of a connected mode without user traffic is greater than or equal to preset timing duration TA. In this way, the mobile phone can actively enter an idle mode and display the 5G network icon as soon as possible, to avoid a case in which an RRC is not released for a long time due to reasons such as a network exception or the like after the mobile phone switches to the 4G connected mode, reduce power consumption required by the mobile phone to maintain the air interface connection, save power of the mobile phone, improve a display camping ratio of the 5G network icon, and improve user experience.

For example, refer to FIG. 12. On an occasion A, the mobile phone switches from the 4G idle mode to the 4G connected mode, and switches from displaying the 5G network icon to displaying the 4G network icon. On an occasion B, the mobile phone detects that there is no user traffic, and therefore starts a timer A. However, the mobile phone is still in the 4G connected mode, and therefore still displays the 4G network icon. On an occasion C, the timer A expires, and the mobile phone is triggered to switch from the 4G connected mode to the 4G idle mode, and switch from displaying the 4G network icon to displaying the 5G network icon corresponding to the 4G idle mode. In this way, the mobile phone releases the RRC connection after the preset timing duration TA corresponding to the timer A. This can avoid a case in which an RRC is not released for a long time due to reasons such as a network exception or the like after the mobile phone switches to the 4G connected mode, reduce power consumption required by the mobile phone to maintain the air interface connection, and save power of the mobile phone. In addition, compared with the solution shown in FIG. 2, after switching from the idle mode to the 4G connected mode, the mobile phone may display the 5G network icon for a longer time, thereby improving a display camping ratio of the 5G network icon and improving user experience.

In other words, when the delayer 1 is not set, after switching from the 4G idle mode to the 4G connected mode, the mobile phone displays the 4G network icon. The mobile phone starts the timer A after detecting that there is no user traffic in the 4G connected mode. If the mobile phone determines that the duration in which there is no user traffic in the 4G connected mode is greater than or equal to TA, after the timer A stops timing, the mobile phone sends disconnection request information to the network side device, to request to release the RRC connection. The network side device may send disconnection indication information to the mobile phone to indicate to release the RRC connection. After releasing the RRC connection, the mobile phone enters the 4G idle mode and displays the 5G network icon.

It should be noted that, when the operator sets the delayer 1, the mobile phone displays the 5G network icon within an effective time period of the delayer 1 (namely, within a time period in which the delayer 1 does not expire and is not terminated by the termination condition after being started).

For example, when the delayer 1 is set, after the mobile phone switches from the 4G idle mode to the 4G connected mode, the delayer 1 is started and the 5G network icon is displayed. The delayer 1 corresponds to the preset delay duration T1. If the mobile phone detects that there is no user traffic in the 4G connected mode, the mobile phone starts the timer A. The timer A corresponds to the preset timing duration TA. If the duration in which the mobile phone has no user traffic in the 4G connected mode is greater than or equal to TA, and the timer A stops timing before the delayer 1, after the timer A stops timing, the mobile phone sends the disconnection request information to the network side device, to request to release the RRC connection. The network side device may send the disconnection indication information to the mobile phone to indicate to release the RRC connection. After releasing the RRC connection and entering the 4G idle mode, the mobile phone displays the 5G network icon, and stops timing of the delayer 1.

Alternatively, if the delayer 1 stops timing before the timer A, the mobile phone displays the 4G network icon after the delayer 1 stops timing. If the duration in which the mobile phone has no user traffic in the 4G connected mode is greater than or equal to TA, the mobile phone sends the disconnection request information to the network side device after the timer A stops timing, to request to release the RRC connection. The network side device may send the disconnection indication information to the mobile phone to indicate to release the RRC connection. After releasing the RRC connection, the mobile phone enters the 4G idle mode and displays the 5G network icon.

In addition, for example, for a schematic diagram of an interface for displaying the 5G network icon by the mobile phone, refer to (a) in FIG. 13. For a schematic diagram of an interface for displaying the 4G network icon by the mobile phone, refer to (b) in FIG. 13.

In the foregoing embodiment, the delayer 1 and the delayer 2 are started/timed/terminated at a mobile phone side. In some other embodiments, the delayer 1 and the delayer 2 may also be started/timed/terminated by the network side device (for example, a base station), and notified to the mobile phone.

In some other embodiments of this application, without being limited to the foregoing target scenario and the D+A icon display solution in the NSA networking mode, in any scenario of the NSA networking mode, if a preset condition is met, the mobile phone may send disconnection request information to the network side device, to actively request to release the air interface connection. For example, the preset condition includes one or more of the condition (1) to the condition (6). For another example, the preset condition includes the foregoing condition (7). In this way, by using the method, the mobile phone may actively request to release the air interface connection, to avoid a case in which an air interface is not released for a long time due to reasons such as a network exception or the like, save power consumption required by the mobile phone to maintain the air interface connection, and save power of the mobile phone. The connected mode herein includes the 4G connected mode and the dual connectivity mode. That is, regardless of whether the mobile phone enters the 4G connected mode or the dual connectivity mode, the mobile phone may request the network side device to release the air interface connection provided that the mobile phone determines that duration in which there is no user traffic is greater than or equal to TC.

For example, when the preset condition is the foregoing condition (7), if the mobile phone determines that duration in which there is no user traffic after the dual connectivity mode is entered is greater than or equal to the preset timing duration TC, the mobile phone may send the disconnection request information to the network side device, to actively request to release the air interface connection. In this case, there may be a plurality of manners in which the mobile phone requests to release the air interface connection. The following uses examples for description.

Manner 1: The mobile phone sends SCG release request information (for example, SCGFailureInformationNR-r15) to the network side device, and the network side device releases an SCG, and releases an NR connection to the mobile phone side. Then, the mobile phone sends RRC disconnection request information (for example, Tracking Area Update Request) to the network side device, and the network side device releases an RRC connection to the mobile phone side.

Manner 2: The mobile phone sends RRC disconnection request information (for example, Tracking Area Update Request) to the network side device, and the network side device first releases an SCG (for example, sends SCGFailureInformationNR to the mobile phone), and releases an NR connection to the mobile phone side. Then, the network side device releases an RRC connection to the mobile phone side.

In some other embodiments of this application, without being limited to the NSA networking mode, in a standalone (SA) networking mode and in a 6G or another future evolved mobile communication network, the mobile phone enters a connected mode after registering with a first cell. If a preset condition is met, the mobile phone sends disconnection request information to the network side device, to request to release a connection between the mobile phone and the first cell. In response to releasing the connection between the mobile phone and the first cell, the mobile phone enters an idle mode.

In other words, in the SA networking mode and in the 6G or another future evolved mobile communication network, after the mobile phone enters the connected mode in the first cell, if the preset condition is met, the mobile phone may send the disconnection request information to the network side device, to actively request to release an air interface connection. For example, the preset condition includes one or more of the condition (1) to the condition (6). For another example, the preset condition includes the foregoing condition (7). In this way, by using the method, the mobile phone may actively request to release the air interface connection, to avoid a case in which an air interface is not released for a long time due to reasons such as a network exception or the like, save power consumption required by the mobile phone to maintain the air interface connection, and save power of the mobile phone.

It should be noted that in a 4G+5G NSA networking mode, the air interface connection may be an RRC connection. In another scenario, the air interface connection may alternatively have another name. A name of the air interface connection is not limited in embodiments of this application. In addition, in the 4G+5G NSA networking mode, the disconnection request information may be a TAU request message. In another scenario, the disconnection request information may alternatively have another name, for example, registration update request information. A name of the disconnection request information is not limited in embodiments of this application. The disconnection request information is information exchanged when there is no user traffic, and is signaling-based request information.

In embodiments of this application, preset timing duration TA, TB, TC, or the like of a timer set at the mobile phone side may be flexibly configured. For example, TB may be less than or equal to the preset delay duration T2 of the delayer 2, or TB may be greater than the preset delay duration T2 corresponding to the delayer 2. For another example, the preset timing duration TA, TB, TC, or the like may be adjusted in real time based on an actual network environment. For example, in a conventional technology of statistics in an area, if the network side releases the air interface connection after 20$s$ on average when there is no user traffic in a connected mode, TC of a timer at the mobile phone side may be less than or equal to 20 s, for example, may be 10 s or 15 s. In this way, the air interface connection can be requested to be released actively and as soon as possible, to save power consumption and power of the mobile phone.

It may be understood that, to implement the foregoing functions, the terminal device includes a corresponding hardware and/or software module for performing each function. Algorithm operations in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the terminal device may be divided into functional modules based on the foregoing method examples, for example, each functional module may be obtained through division based on each corresponding function, or two or more functions may be integrated into one processing module. The integrated module may be implemented in a form of hardware. It should be noted that, in embodiments, module division is an example, is merely logical function division, and may be other division in actual implementation.

An embodiment of this application further provides a terminal device, including one or more processors and one or more memories. The one or more memories are coupled to the one or more processors. The one or more memories are configured to store computer program code, and the computer program code includes computer instructions. When the one or more processors execute the computer instructions, the terminal device is enabled to perform the foregoing related method operations to implement the network icon display methods in the foregoing embodiments.

An embodiment of this application further provides a computer-readable storage medium. The computer-readable storage medium stores computer instructions. When the computer instructions are executed on a terminal device, the terminal device is enabled to perform the foregoing related method operations to implement the network icon display methods in the foregoing embodiments.

An embodiment of this application further provides a computer program product. When the computer program product is run on a computer, the computer is enabled to perform the foregoing related operations, to implement the network icon display methods performed by the terminal device in the foregoing embodiments.

In addition, an embodiment of this application further provides an apparatus. The apparatus may be a chip, a component, or a module. The apparatus may include a processor and a memory that are connected to each other. The memory is configured to store computer-executable instructions. When the apparatus runs, the processor may execute the computer-executable instructions stored in the memory, so that the chip performs the network icon display methods performed by the terminal device in the foregoing method embodiments.

The terminal device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Another embodiment of this application provides a communication system. The communication system may include the foregoing terminal device and a network side device. The network side device may include an access network device (for example, a base station), a core network device, and the like, and may be configured to implement the foregoing network icon display method.

Based on the foregoing descriptions of the embodiments, a person skilled in the art may understand that for the purpose of convenient and brief descriptions, division into the foregoing functional modules is merely used as an example for descriptions. In actual application, the foregoing functions can be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for enabling a device (which may be a single-chip microcomputer, a chip, or the like) or a processor to perform all or some of the operations of the method described in embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network icon display method applied to a terminal device, comprising:

displaying a 5G network icon, wherein the terminal device is connected to a long term evolution (LTE) cell and a new radio (NR) cell by using a dual connectivity technology, and the LTE cell supports a non-standalone (NSA) networking mode;

entering a 4G connected mode after disconnecting from the NR cell;

sending first request information to a network side device when a preset condition is met including a duration in which there is less user traffic in the 4G connected mode is greater than or equal to a first preset duration, wherein the first request information is used to request to release a connection to the LTE cell; and in response to releasing the connection to the LTE cell, entering a 4G idle mode, and displaying the 5G network icon.

2. The method according to claim 1, wherein the first request information is used to indicate that the terminal device has no user traffic, and the first request information is a tracking area update (TAU) request message.

3. The method according to claim 1, wherein the preset condition comprises one or more of following items:

entering a screen-off state; entering a power saving mode or an ultra power saving mode; a temperature being greater than or equal to a first preset threshold; a power being less than or equal to a second preset threshold; an uplink rate being less than or equal to a third preset threshold; or running only an application in a whitelist.

4. The method according to claim 1, wherein the method further comprises:

displaying a 4G network icon after entering the 4G connected mode and before entering the 4G idle mode.

5. The method according to claim 1, wherein the method further comprises:

after entering the 4G connected mode, starting a first delayer and displaying the 5G network icon.

6. The method according to claim 5, wherein the sending the first request information to the network side device when the preset condition is met comprises:

when it is detected that there is no user traffic in the 4G connected mode, starting a first timer, wherein the first timer corresponds to the first preset duration; and when the duration in which there is no user traffic in the 4G connected mode is greater than or equal to the first preset duration, and the first timer stops timing before the first delayer, sending the first request information to the network side device after the first timer stops timing; and the method further comprises:

stopping timing of the first delayer after entering the 4G idle mode.

7. The method according to claim 5, wherein the sending first request information to the network side device when the preset condition is met comprises:

when it is detected that there is no user traffic in the 4G connected mode, starting a first timer, wherein the first timer corresponds to the first preset duration;

when the first delayer stops timing before the first timer, displaying a 4G network icon after the first delayer stops timing; and when the duration in which there is no user traffic in the 4G connected mode is greater than or equal to the first preset duration, sending the first request information to the network side device after the first timer stops timing.

8. The method according to claim 5, wherein the first delayer corresponds to a preset delay duration (T2), and the method further comprises:

starting a first timer after entering the 4G connected mode, wherein the first timer corresponds to the first preset duration (TB), and the TB is less than or equal to the T2;

the sending the first request information to the network side device when the preset condition is met comprises:

when the duration in which there is no user traffic in the 4G connected mode is greater than or equal to the TB, sending the first request information to the network side device after the first timer stops timing; and the method further comprises:

stopping timing of the first delayer after entering the 4G idle mode.

9. The method according to claim 5, wherein the first delayer corresponds to a preset delay duration (T2), the T2 is equal to the first preset duration, and the sending the first request information to the network side device when the preset condition is met comprises:

When the duration in which there is no user traffic in the 4G connected mode is greater than or equal to the T2, sending the first request information to the network side device after the first delayer stops timing.

10. The method according to claim 5, wherein the first delayer corresponds to a preset delay duration (T2), and the method further comprises:

starting a first timer after entering the 4G connected mode, wherein the first timer corresponds to the first preset duration (TB), and the TB is greater than the T2; and displaying a 4G network icon after the first delayer stops timing; and the sending the first request information to the network side device when the preset condition is met comprises:

when the duration in which there is no user traffic in the 4G connected mode is greater than or equal to the TB, sending the first request information to the network side device after the first timer stops timing.

11. A network icon display method applied to a terminal device, comprising:

displaying a 5G network icon, wherein the terminal device enters a 4G idle mode after registering with a long term evolution (LTE) cell, and the LTE cell supports a non-standalone (NSA) networking mode;

entering a 4G connected mode after establishing a connection to the LTE cell;

sending first request information to a network side device when a preset condition is met including a duration in which there is less user traffic in the 4G connected mode being greater than or equal to a second preset duration, wherein the first request information is used to request to release the connection between the terminal device and the LTE cell; and in response to releasing the connection to the LTE cell, entering the 4G idle mode, and displaying the 5G network icon.

12. The method according to claim 11, wherein the preset condition comprises one or more of following items:

entering a screen-off state; entering a power saving mode or an ultra power saving mode; a temperature being greater than or equal to a first preset threshold; a power being less than or equal to a second preset threshold; an uplink rate being less than or equal to a third preset threshold; or running only an application in a whitelist.

13. The method according to claim 11, wherein the method further comprises:

displaying a 4G network icon after entering the 4G connected mode and before entering the 4G idle mode.

14. The method according to claim 11, wherein the method further comprises:

after entering the 4G connected mode, starting a second delayer and displaying the 5G network icon.

15. The method according to claim 14, wherein the sending the first request information to the network side device when the preset condition is met comprises:

when it is detected that there is no user traffic in the 4G connected mode, starting a second timer, wherein the second timer corresponds to the second preset duration; and when the duration in which there is no user traffic in the 4G connected mode is greater than or equal to the second preset duration, and the second timer stops timing before the second delayer, sending the first request information to the network side device after the second timer stops timing; and the method further comprises:

stopping timing of the second delayer after entering the 4G idle mode.

16. The method according to claim 14, wherein the sending first request information to the network side device when the preset condition is met comprises:

when it is detected that there is no user traffic in the 4G connected mode, starting a second timer, wherein the second timer corresponds to the second preset duration;

when the second delayer stops timing before the second timer, displaying a 4G network icon after the second delayer stops timing; and when the duration in which there is no user traffic in the 4G connected mode is greater than or equal to the second preset duration, sending the first request information to the network side device after the second timer stops timing.

17. A terminal device, comprising:

a screen, configured to display a network icon;

one or more processors;

a memory; and one or more computer programs, wherein the one or more computer programs are stored in the memory, the one or more computer programs comprise instructions, and when the instructions are executed by the terminal device, the terminal device is enabled to perform following operations:

displaying a 5G network icon on the screen, wherein the terminal device is connected to a long term evolution (LTE) cell and a new radio (NR) cell by using a dual connectivity technology, and the LTE cell supports a non-standalone (NSA) networking mode;

entering a 4G connected mode after disconnecting from the NR cell;

sending first request information to a network side device when a preset condition is met including a duration in which there is less user traffic in the 4G connected mode being greater than or equal to a first preset duration, wherein the first request information is used to request to release a connection to the LTE cell; and in response to releasing the connection to the LTE cell, entering a 4G idle mode, and display the 5G network icon.

18. The terminal device according to claim 17, wherein the first request information is used to indicate that the terminal device has no user traffic, and the first request information is a tracking area update (TAU) request message.

19. The terminal device according to claim 17, wherein the preset condition comprises one or more of following items:

entering a screen-off state; entering a power saving mode or an ultra power saving mode; a temperature being greater than or equal to a first preset threshold; a power being less than or equal to a second preset threshold; an uplink rate being less than or equal to a third preset threshold; or running only an application in a whitelist.

20. The terminal device according to claim 17, wherein the operations further comprise:

displaying a 4G network icon after entering the 4G connected mode and before entering the 4G idle mode.

* * * * *